US012764628B2

(12) United States Patent
Bisht et al.

(10) Patent No.: US 12,764,628 B2
(45) Date of Patent: Oct. 13, 2026

(54) SYSTEM AND METHOD FOR ACTIVE STANDBY POLICY BASED ROUTING IN A NETWORK

(71) Applicant: JIO PLATFORMS LIMITED, Ahmedabad (IN)

(72) Inventors: Sandeep Bisht, Kalyan (IN); Ezaj Ahmed Ansari, Darjeeling (IN); Ravindra Kumar Yadav, Orai (IN); Aayush Bhatnagar, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 656 days.

(21) Appl. No.: 18/029,687

(22) PCT Filed: Mar. 24, 2023

(86) PCT No.: PCT/IB2023/052925
§ 371 (c)(1),
(2) Date: Mar. 31, 2023

(87) PCT Pub. No.: WO2023/187574
PCT Pub. Date: Oct. 5, 2023

(65) Prior Publication Data

US 2025/0088937 A1 Mar. 13, 2025

(30) Foreign Application Priority Data

Mar. 31, 2022 (IN) ............................ 202221019655

(51) Int. Cl.
*H04W 40/00* (2009.01)
*H04L 45/00* (2022.01)
(Continued)

(52) U.S. Cl.
CPC ........... *H04W 40/005* (2013.01); *H04L 45/22* (2013.01); *H04L 45/247* (2022.05); *H04L 45/70* (2013.01); *H04W 84/042* (2013.01)

(58) Field of Classification Search
CPC H04W 40/005; H04W 84/042; H04L 45/247; H04L 45/22; H04L 45/70
See application file for complete search history.

(56) References Cited

U.S. PATENT DOCUMENTS

2016/0080268 A1* 3/2016 Anand ................ H04L 41/0668 370/230.1
2018/0132118 A1* 5/2018 Nekovee ............ H04L 47/2425
(Continued)

FOREIGN PATENT DOCUMENTS

CN 101371499 B 2/2012
WO WO-2021205212 A1 * 10/2021 ......... H04L 65/1045

OTHER PUBLICATIONS

Shekhar, Ravi; Parikh, Dishant; and Belsare, Suyog, "Consumer NF Authentication and Service Authorization Using an SCP for an ESBA Based 5G Core Network", Sep. 2020. (Year: 0920).*
(Continued)

*Primary Examiner* — Khai M Nguyen
(74) *Attorney, Agent, or Firm* — FINNEGAN, HENDERSON, FARABOW, GARRETT & DUNNER LLP

(57) ABSTRACT

The present disclosure pertains to a system and method that enables routing of requests based on active standby routing policy. Prior to routing, the system and method may enable identification/configuration of pair of endpoints pertaining to, for example, an active cluster and a DR cluster. In an example embodiment, the request may be routed to the identified/configured pair if at least one endpoint in the pair may be functional. For example, each endpoint in active cluster may be paired with a corresponding endpoint in the
(Continued)

DR cluster to enable routing of request to DR endpoint when the corresponding endpoint in the active cluster may be unavailable. The identification/configuration of pair of endpoints, prior to the routing, may enable effective routing management of the incoming requests.

34 Claims, 15 Drawing Sheets

(51) Int. Cl.
*H04L 45/247* (2022.01)
*H04W 84/04* (2009.01)

(56) References Cited

U.S. PATENT DOCUMENTS

2021/0409335 A1* 12/2021 Zhu ......................... H04L 47/24
2022/0103597 A1* 3/2022 Gobena ................. H04L 63/205

OTHER PUBLICATIONS

International Search Report issued by the International Searching Authority issued in related Foreign Application No. PCT/IB2023/052925, mailed Jul. 19, 2023 (2 pgs.).
Shekhar, Ravi et al.; "Consumer NF Authentication and Service Authorization Using an SCP for an ESBA Based 5G Core Network," Technical Disclosure Commons, Defensive Publications Series, Sep. 2020 https://www.tdcommmons.org/cgi/viewcontent.cgi?article=4685&content=dpubs_series.

* cited by examiner

| SL No | PLMN-ID | CONTEXT | TARGET ENDPOINT |
|---|---|---|---|
| 1 | PLMN-1 | CONTEXT-1 | TARGET ENDPOINT-1 |
| 2 | PLMN-2 | CONTEXT-2 | TARGET ENDPOINT-2 |
| 3 | PLMN-3 | CONTEXT-3 | TARGET ENDPOINT-3 |
| . | . | . | . |
| N | PLMN-N | CONTEXT-N | TARGET ENDPOINT-N |

FIG. 8B

SYSTEM AND METHOD FOR ACTIVE STANDBY POLICY BASED ROUTING IN A NETWORK

FIELD OF INVENTION

The embodiments of the present disclosure relates generally to the field of routing, and more particularly, to next generation network techniques that enable routing, especially based on active standby policy in next generation networks such as 5G networks.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Availability of fast and uninterrupted communication facility has become imperative in current high-technology world. Many communication devices such as, smart phones, laptops, tablets, and the likes, exist for contending the requirement of fast and uninterrupted communication facility. These communication devices may be connected through various wired and wireless network technologies.

However, as the usage and number of the communication devices are increasing day-by-day at an exponential rate, this may have resulted in increased complexity of the existing networks. Due to this, the existing services may pertain to poor service quality, security, and efficiency in the current communication networks. In such a scenario, a router may act as a primary control point, which aids in casing out the increasing complexities of the networks, thus providing reliable service quality and security. This also facilitates monitoring and improvement in efficiency, and other attributes that allow networks to add value. Therefore, by controlling a router one may control corresponding network to a great extent.

In general, routing may be defined as a mechanism of selecting a specific path in a network or between or across multiple networks for transmitting data quickly between a first communication device and a second communication device, which may be located remotely from each other. The routing process may be performed on various networks including circuit-switched networks, for instance, public switched telephone network (PSTN), as well as computer networks, for instance, Internet. In the routing process, routing tables may be frequently used to direct the forwarding of data packets. These routing tables may keep track of the paths to different network destinations and may be created with the use of routing protocols, learned from network traffic, or may be provided by an administrator. In general, 5G service-based architecture may be designed in a way that all Network Functions (NF) may be closely interconnected, wherein the NFs may possess the ability to discover the peer nodes and transmit network information among the nodes. This approach may be bound to create a spaghetti of inter connections between several user devices, such as laptop, smartphone, tablet, and the likes, connected through a network, which may hamper the flow of data between the user devices and may cause traffic or congestion. Further, this may also not allow a system to fully utilize the available resources as, for example, some endpoints or nodes may be available for routing but due to lack of information, the node may remain unused.

Conventional systems and methods are configured within a network that includes of several nodes, each having a distinct deployment scenario/architecture and functionality. Routing algorithms in the conventional systems and methods cannot manage distinct deployment scenario/architecture and functionality of each node. Hence establishment of communication channel between the nodes may get effected, which may, in turn, adversely affect flow of data in the network. In addition, current systems and methods or routing techniques are unable to process a request related to transmission of data that corresponds to a node which is down/unavailable. In this case, the unavailability may not be known until the routing is performed.

Hence, there is a need to provide a routing solution, which may overcome the above-mentioned limitations and may provide effective routing management to evaluate availability of endpoints before routing is performed, and which may be agnostic of implementation architecture.

OBJECTS OF THE PRESENT DISCLOSURE

It is an object of the present disclosure to provide a 5G service based architecture that optimizes signalling controls.

It is an object of the present disclosure to enable a service provider to obtain better visibility into a core network.

It is an object of the present disclosure to provide a Service Communication Proxy (SCP) that enables message forwarding and routing to destination Network Function (NF)/NF service.

It is an object of the present disclosure to provide the SCF that enables communication security, load balancing, monitoring, and overload control.

It is an object of the present disclosure to configure endpoint details pair wise.

It is an object of the present disclosure that routes total received requests in a round robin technique between the pairs of endpoints.

It is an object of the present disclosure to provide multiple of 2 endpoints and in correct sequence required for an NF Profile that is used for registration.

It is an object of the present disclosure to enable effective management of the incoming requests.

It is an object of the present disclosure to save unnecessary re-routing and may also facilitate effective routing steps.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for performing ingress/egress active-standby-spare routing in a network. The system may include a Service Communication Proxy (SCP) controller in communication with a plurality of endpoints, the plurality of endpoints may be grouped in either a first public land mobile network (PLMN) cluster or a second PLMN cluster such that an n number endpoint of the first PLMN cluster forms a pair with an n+2 number endpoint of the second PLMN cluster, where n is any natural number. The SCP controller may further include one or more processors coupled to a memory storing instructions executable by the one or more processors, the SCP controller configured to receive, from one or mode source node devices in communication with the SCP controller, a plurality of requests to be transmitted to the first and the second PLMN clusters, determine status of a plurality of paired n number endpoint and n+2 number end point associated with the first and the second PLMN clusters respectively; and route, the plurality of requests equally through the first PLMN cluster for transmitting to each said paired n number endpoint and the n+2 number endpoint associated with the first PLMN cluster and the second PLMN cluster, when the status of each said paired n number endpoint and the n+2 number endpoint is determined to be active. The plurality of requests may be routed equally to paired n number endpoint and the n+2 number endpoint associated with the first PLMN cluster and the second PLMN cluster respectively based on a round robin technique.

In an embodiment, the routing may be used at any or a combination of egress and ingress proxy.

In an embodiment, the SCP controller may be configured to route the plurality of requests to only one endpoint in a pair at a time.

In an embodiment, prior to routing, the SCP controller may be configured to identify at least one available endpoint of the pair of endpoints pertaining to the first PLMN cluster and the second PLMN cluster. The first PLMN cluster may include active endpoints to which the plurality of requests is routed if the active endpoints may be available, and the second PLMN cluster may include alternative endpoints for routing the plurality of requests if the corresponding active endpoints may be un-available or non-functional.

In an embodiment, the routing, based on identification of the pair of endpoints may be performed based on pre-defined policy of the SCP controller.

In an embodiment, when all the plurality of end points are active, the SCP controller may be configured to route 50% of the plurality of requests to a first pair comprising the n number endpoint of the first PLMN cluster and the n+2 number endpoint of the second PLMN cluster while the other 50% of the plurality of requests is routed to a second pair comprising a 2n number endpoint of the first PLMN cluster and a 2n+2 number endpoint of the second PLMN cluster.

In an embodiment, when the n number end point of the first pair is inactive and the remaining end points are active, the SCP controller may be configured to route 50% of the plurality of requests to the n+2 number endpoint of the second PLMN cluster while the other 50% of the plurality of requests is routed to the 2n number endpoint of the first PLMN cluster.

In an embodiment, when the 2n number end point of the second pair is inactive and the remaining end points are active, the SCP controller may be configured to route 50% of the plurality of requests to the n number endpoint of the first PLMN cluster while the other 50% of the plurality of requests is routed to the 2n+2 number endpoint of the second PLMN cluster.

In an embodiment, when either or both n+2 number endpoint and the 2n+2 number endpoint of the second PLMN cluster are inactive and the remaining end points are active, the SCP controller may be configured to route the plurality of requests equally to the n number endpoint of the first PLMN cluster and the 2n number endpoint of the first PLMN cluster.

In an embodiment, when either or both n number endpoint and the 2n number endpoint of the first PLMN cluster are inactive and the remaining end points are active, the SCP controller may be configured to route the plurality of requests equally to the n+2 number endpoint of the first PLMN cluster and the 2n+2 number endpoint of the second PLMN cluster.

In an embodiment, when both n number endpoint and the n+2 number endpoint of the first pair are inactive, the SCP controller may be configured to route 100% of the plurality of requests to the 2n number endpoint of the first PLMN cluster.

In an embodiment, when both 2n number endpoint and the 2n+2 number endpoint of the second pair is inactive, the SCP controller may be configured to route 100% of the plurality of requests to the n number endpoint of the first PLMN cluster.

In an embodiment, when only one endpoint is active while remaining endpoints are inactive, the SCP controller may be configured to route the plurality of requests routed to the only active endpoint.

In an embodiment, the number of endpoints in the first PLMN cluster may be equal to the number of endpoints in the second PLMN cluster.

In an embodiment, the second PLMN cluster may be a disaster recovery (DR) cluster for the first PLMN cluster.

In an embodiment, with O based indexing, endpoint at even index belongs to the first PLMN cluster while odd index belongs to the DR cluster.

In an aspect, the present disclosure provides a method for performing ingress/egress active-standby-spare routing in a network. The method may include the steps of receiving, by a Service Communication Proxy (SCP) controller a plurality of requests to be transmitted to the first and the second PLMN clusters from one or mode source node devices in communication with the SCP controller. The SCP controller may be in communication with a plurality of endpoints that may be grouped in either a first PLMN cluster or a second PLMN cluster such that an n number endpoint of the first PLMN cluster forms a pair with an n+2 number endpoint of the second PLMN cluster, where n is any natural number. The SCP controller may further include one or more processors coupled to a memory storing instructions executable by the one or more processors. The method may further include the step of determining, by the SCP controller, status of a plurality of paired n number endpoint and n+2 number end point associated with the first and the second PLMN clusters respectively; and routing, by the SCP controller, the plurality of requests equally through the first PLMN cluster for transmitting to each paired n number endpoint and the n+2 number endpoint associated with the first PLMN cluster and the second PLMN cluster respectively, when the status of each paired n number endpoint and the n+2 number endpoint is determined to be active. The plurality of requests may be routed equally to each paired n number endpoint and the n+2 number endpoint associated with the first PLMN cluster and the second PLMN cluster respectively based on a round robin technique.

In an aspect, the present disclosure provides a user equipment (UE) communicatively coupled with a Service Communication Proxy (SCP) controller, the SCP controller coupling comprises steps of receiving a connection request from the UE, sending an acknowledgment of connection request to the SCP controller, transmitting a plurality of signals in response to the connection request, and the SCP controller may be in communication with at least two one public land mobile network (PLMN) clusters.

In an aspect, the present disclosure relates to a non-transitory computer-readable medium including processor-executable instructions that cause a processor to receive, from one or mode source node devices in communication with the processor, a plurality of requests to be transmitted to first PLMN cluster and a second PLMN cluster. The processor may be in communication with a plurality of endpoints. The plurality of endpoints may be grouped in either the first PLMN cluster or the second PLMN cluster such that an n number endpoint of the first PLMN cluster forms a pair with corresponding n+2 number endpoint of the second PLMN cluster, where n is any natural number. The processor may determine a status of a plurality of paired n number endpoint and n+2 number endpoint associated with the first and the second PLMN clusters, respectively. Further, the processor may route the plurality of requests equally through the first PLMN cluster for transmitting to each said paired n number endpoint and the n+2 number endpoint associated with the first PLMN cluster and the second PLMN cluster, when the status of each said paired n number endpoint and the n+2 number endpoint is determined to be active. The plurality of requests may be routed equally to the paired n number endpoint and the n+2 number endpoint associated with the first PLMN cluster and the second PLMN cluster, respectively, based on a round robin technique.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 8A-8B illustrate exemplary representations showing tabular data or information pertaining to active standby routing, in accordance with an embodiment of the present disclosure.

Figure 1A:
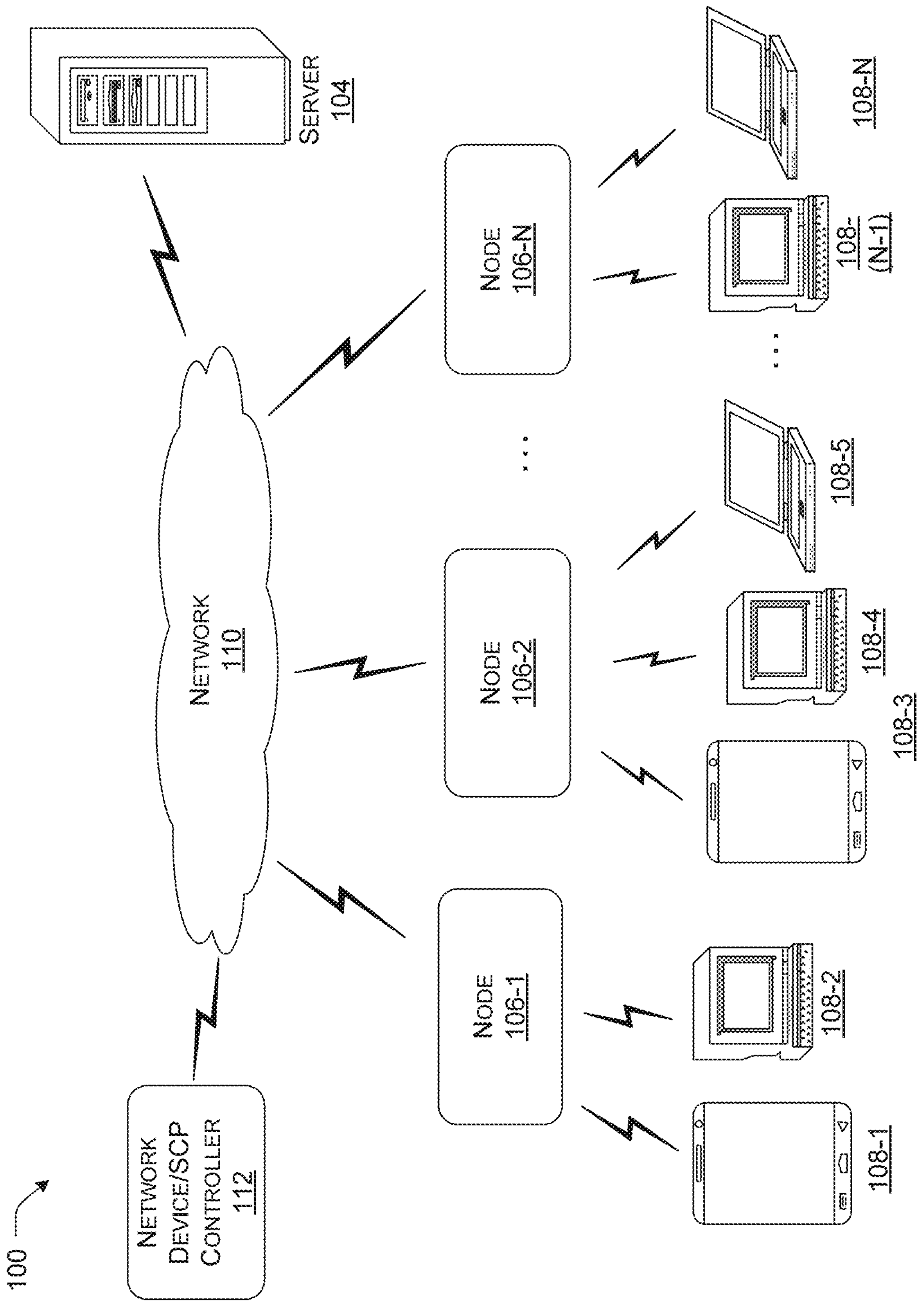
FIGS. 1A-1B illustrate network architecture in which or with which the proposed system may be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter may each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

The word “exemplary” and/or “demonstrative” is used herein to mean serving as an example, instance, or illustration. For the avoidance of doubt, the subject matter disclosed herein is not limited by such examples. In addition, any aspect or design described herein as “exemplary” and/or “demonstrative” is not necessarily to be construed as preferred or advantageous over other aspects or designs, nor is it meant to preclude equivalent exemplary structures and techniques known to those of ordinary skill in the art. Furthermore, to the extent that the terms “includes,” “has,” “contains,” and other similar words are used in either the detailed description or the claims, such terms are intended to be inclusive—in a manner similar to the term “comprising” as an open transition word—without precluding any additional or other elements.

Reference throughout this specification to “one embodiment” or “an embodiment” or “an instance” or “one instance” means that a particular feature, structure, or characteristic described in connection with the embodiment is included in at least one embodiment of the present invention. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

The present disclosure provides a system and method that may overcome the above-mentioned limitations and may facilitate an effective and improved management of traffic routing pertaining to incoming requests. In an example embodiment, the system may include Service Communication Proxy (SCP) implementation, which may facilitate to evaluate, identify and/or configure pair of endpoints prior to routing. For example, this may be performed based on pre-defined SCP policy such as active-standby policy or other associated integrated policies. In an example embodiment, prior to routing, the system and method may enable an identification/configuration of pair of endpoints in clusters pertaining to, for example, an active cluster and disaster recovery (DR) cluster. The active cluster may include active endpoints to which request may be preferably routed if the endpoint may be available. The DR cluster may include DR endpoints, wherein the DR endpoints may be considered an alternative endpoint for routing the request if the corresponding active endpoint may be un-available or non-functional.

The identification/configuration of pair of endpoints may enable to understand the active endpoints and corresponding DR endpoints that may be available for routing, prior to the routing is performed, which may enable effective routing management of the incoming requests. In an example embodiment, as per active-standby policy, each endpoint in active cluster may be paired with a corresponding endpoint in the DR cluster to form a pair of endpoints. In an example embodiment, the SCP may include a SCP controller to enable identification/configuration/mapping of endpoints in disaster recovery (DR) cluster for corresponding set of active cluster. In an example embodiment, the request may be routed to the identified/configured pair if at least one endpoint in the pair may be functional. For example, the SCP may evaluate when an endpoint of the active cluster, for example, a first endpoint is unavailable and may be able to identify or configure a corresponding endpoint in DR cluster, prior to routing the request. In another example, the SCP may evaluate when an endpoint, for example, a first endpoint of an active cluster is unavailable and also may be able to also evaluate if the corresponding DR endpoint (second endpoint) pertaining to the first endpoint is unavailable so that the request may not be routed at all to either the first or second endpoint in the pair.

In an example embodiment, active standby routing policy may be used at ingress node or egress node of SCP. In an embodiment, the active standby routing policy endpoint details may be configured pair wise such that at a given time only one endpoint in the pair may receive request. In an example, total received requests may be round robin between the pairs of endpoints.

Further, the system and method may be agnostic to architecture, structure, functionality of each node, and implementation of Network Functions. Furthermore, the system and method may facilitate SCP implementation that may enable load balancing, routing, traffic monitoring, congestion control, service discovery and other such functions in an effective manner. Various other associated embodiments or advantages may be possible.

Figure 1B:
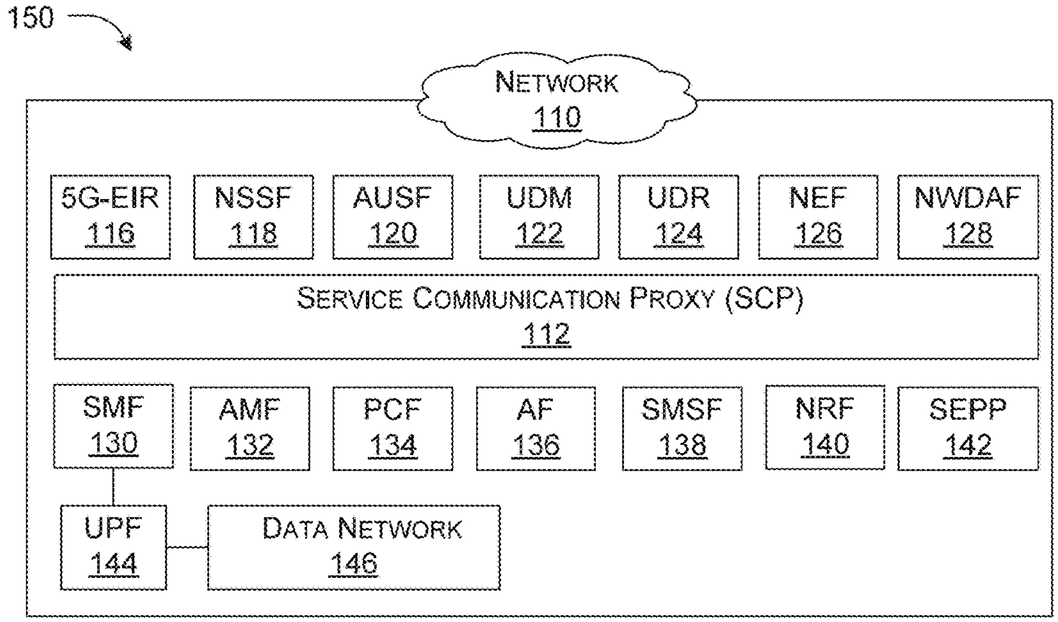

FIGS. 1A-1B illustrate network architecture in which or with which the proposed system may be implemented, in accordance with an embodiment of the present disclosure. In general, next generation architecture, for example, 5G service-based network architecture may be designed in a way that multiple nodes may be closely interconnected, and the corresponding network functions. In an embodiment, some of the network functions of the 5G network architecture may be as follows:

- Access and Mobility Management function (AMF): The AMF may receive all connection and session related information from a communication device (also referred to as User Equipment or UE, herein), and is responsible for handling connection and mobility management tasks. For instance, the AMF may aid in termination of NAS (Non-Access Stratum) signalling, NAS ciphering and integrity protection, and management tasks, such as, but not limited to, registration management, connection management, mobility management, access authentication and authorization, security context management.
- Session Management function (SMF): The SMF may carry out functions related to session management, for example, session establishment, modification, and release. Further, the SMF may handle User Equipment (UE) IP address allocation and management, DHCP functions, termination of NAS signalling related to session management, DL data notification, traffic steering configuration for user plane function (UPF) for proper traffic routing, and the like.
- User plane function (UPF): The UPF may connect actual data coming over corresponding Radio Area Network (RAN) to the Internet. In an exemplary embodiment, the UPF may carry out packet routing and forwarding, packet inspection, handle Quality of Service (QoS). Further, the UPF may acts as external PDU session point of interconnect to Data Network (DN), and also may act as an anchor point for intra-RAT mobility as well as inter-RAT mobility.

Policy Control Function (PCF): The PCF may provide unified policy framework, policy rules to CP functions, and access subscription information for policy decisions in UDR.

Authentication Server Function (AUSF): The AUSF may act as an authentication server, and function to check authenticity of information flowing through it.

Unified Data Management (UDM): The UDM may generate Authentication and Key Agreement (AKA) credentials, perform user identification handling, access authorization, and carry out subscription management.

Application Function (AF): The AF may check application influence on traffic routing, access NEF, and may interact with policy framework for policy control.

Network Exposure function (NEF): The NEF may carry out functions like exposure of capabilities and events, secure provision of information from external application to 3GPP network, and translation of internal/external information.

NF Repository function (NRF): The NRF may perform service discovery function, maintains NF profile and check available NF instances.

Network Slice Selection Function (NSSF): The NSSF may aid in selecting of network slice instances to serve the UE, determining the allowed NSSAI, determining the AMF set to be used to serve the UE.

In an embodiment, the proposed system 100 may not only resolve the challenges introduced by the 5G service-based architecture but may also be able to optimize signalling controls. The system 100 may enable a service provider to get a better visibility towards a core network, where the core network may be defined as backbone of the network architecture. For example, in the present disclosure, the core network may pertain to 5G service-based architecture may be configured to interconnect distinct networks associated with the architecture. Therefore, the core network may provide a path for the exchange of information between one or more of the networks, and corresponding subnetworks. Further, as the backbone, the core network may tie together diverse networks, say LAN, WAN, MAN, etc. which may be there within the same building, in different buildings, in a campus environment, or remotely located over wide areas. The system may also boost the network performance by continuously coordinating with other network functions. According to an embodiment, the 5G system architecture may leverage service-based interactions directly between NF Service consumers and NF Service producers, or indirectly via an SCP (Service Communication Proxy).

As illustrated in FIG. 1A, the proposed system 100 may include a network device 112 implementation including an SCP (112 as shown in FIG. 1B), which may be coupled with a plurality of nodes including Node 106-1, Node 106-2 . . . Node 106-N (collectively referred to as nodes 106, and individually referred to as node 106, hereinafter). The network device 102 may be referred to as the controller 102 and more specifically a SCP controller or simply as the controller 112 herein.

In an example, the SCP controller 112 may be configured to facilitate routing of requests between the plurality of nodes. In an embodiment, each node 106 may be configured to be coupled with a multitude of user devices 108-1, 108-2, 108-3, 108-4 . . . 108-(N−1), 108-N (collectively referred to as user devices 108, and individually referred to as user device or user equipment or UE 108, hereinafter). In one embodiment, the system 100 may enable routing of requests for a secured communication between user devices associated with distinct or same nodes.

In an embodiment, the user device 108 may include a user equipment (UE) communicatively coupled to the controller 112. The coupling may include the steps of receiving a connection request from the controller 112, sending an acknowledgment of connection request to the controller and further transmitting a plurality of signals in response to the connection request.

In an exemplary embodiment, the SCP controller 112 may be implemented as an application server and may be communicably operational or may be communicably coupled with the nodes 106 or user device 108 via a network 110 coupled with a server 104. In another exemplary embodiment, the user device 108 may a wireless device. The wireless device may be a mobile device that may include, for example, cellular telephone, such as a feature phone or smartphone and other devices. The user device 108 may not be limited to the above-mentioned devices, but may include any type of device capable of providing wireless communication, such as a cellular phone, a tablet computer, a personal digital assistant (PDA), a personal computer (PC), a laptop computer, a media centre, a work station and other such devices.

In one embodiment, the network 110 may include or pertain to a core network (such as, for example, 5G core network 114 in FIG. 1B) comprising a plurality of nodes (or end points or proxies). As shown in FIG. 1B and in an example embodiment, the core network 114 may be associated with various elements/components/functions such as, for example, Service Communication Proxy (SCP) 112, Network Functions (NFs) and proxies corresponding to the NFs. In an example embodiment, the system 100 may enable facilitating a service to a user device 108 by effectively routing communication requests (also referred as requests). For example, the SCP 112 may pertain to the core network 114 and may manage/enable routing and various other aspects associated with the received requests. For example, for a request originating from a user, for example, from a consumer node (original node), the SCP 112 may enable to route the requests to the core network 114 through an ingress node or ingress proxy of SCP 112, wherein the ingress node may be an entry point of the communication request in the SCP 112. Further, the SCP 112 may enable routing the request to respective destination node through an egress node or egress proxy of the SCP 112. Thus, the egress node may be an exit point of the communication request in the SCP 112. In an embodiment, the other aspects managed by the SCP 112 may include, but not limited to, configuration of endpoints in active cluster and disaster recovery (DR) cluster, identifying at least one endpoint for routing a request, identifying at least active endpoint and/or corresponding endpoint (standby alternative or disaster recovery (DR) endpoint) in the DR cluster, evaluating a pre-defined criteria prior to routing the request and other such tasks that may enable to effectively manage the routing of the incoming requests.

In an example embodiment, the network may pertain to at least one of a wireless network, a wired network or a combination thereof. The network may be implemented as one of the different types of networks, such as Intranet, Local Area Network (LAN), Wide Area Network (WAN), Internet, and the like. Further, the network may either be a dedicated network or a shared network. The shared network may represent an association of the different types of networks that may use variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the network may pertain to a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. Various other types of communication network or service may be possible.

In an example, the network 110 may utilize different sort of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

In an embodiment, as illustrated in FIG. 1B, the proposed system 100 may facilitate interaction of SCP 112 along with various distinct network components and corresponding network functions, where the SCP 112 may be communicatively coupled to other equipment through the core network 114. In one embodiment, the core network 114 may facilitate communicative coupling of the SCP 112 with 5G-EIR 116, where the 5G-EIR may be defined as an independent network component that may help telecom operators in protecting their networks. The 5G-EIR 116 may aid in protecting a network by providing a mechanism to restrict malicious user terminals in the network.

In other embodiment, the core network 114 may facilitate communicative coupling of the SCP 112 with a network component supporting Network Slice Selection Function 118 (NSSF). The NSSF 118 may enable, for example, to select network slice instances to serve user device 108, determine the allowed NSSAI, and determine AMF set to be used to serve the user device 108. In another embodiment, the SCP 112 may be coupled with a network component supporting Authentication Server Function 120 (AUSF), where the AUSF may act as an authentication server, and function to check authenticity of information flowing through it.

In yet another embodiment, the SCP 112 may be coupled with network components supporting Unified Data Management 122 (UDM 122) and Unified Data Repository 124 (UDR 124), where the UDM 122 may facilitate a centralized technique to control network user data. For instance, the UDM 122 may generate Authentication and Key Agreement (AKA) credentials, perform user identification handling, access authorization, and carry out subscription management. Further, the UDR 124 may act as a converged repository for information related to subscribers and may facilitate service to a number of network functions. For example, the 5G UDM (Unified Data Management) may use the UDR to store and retrieve data pertaining to subscription. Alternatively, the PCF (Policy Control Function) may use the UDR to store and retrieve policy related data. Further, the NEF (Network Exposure Function) may also use the UDR to store subscriber related data that is permitted to be exposed to 3rd party applications.

In one embodiment, the SCP 112 may be coupled with a network component supporting Network Exposure function 126 (NEF 126), where the NEF may carry out functions like exposure of capabilities and events, secure provision of information from external application to 3GPP network, and translation of internal/external information.

In yet another embodiment, the SCP 112 may be coupled with a network component supporting a 5G network data analytics function 128 (NWDAF 128), The NWDAF 128 may be configured to streamline and control the way core network data is produced and consumed, and provide insights and suggest actions to be taken in order to enhance end-user experience. In an exemplary embodiment, the NWDAF 128 may be configured to overcome market fragmentation and proprietary solutions in the area of network analytics. Further, the NWDAF 128 may address at least one of the primary standardization points including, but not limited to, Data collection interface from network nodes Predefined analytics insights Data exposure interface for consumers In an embodiment, the SCP 112 may be coupled with network components supporting Session Management function 130 (SMF), Access and Mobility Management function 132 (AMF), Policy Control Function 134 (PCF), and Application Function 136 (AF), where the SMF 130 may carry out functions related to session management, for example, session establishment, modification, and release. Further, the SMF 130 may handle User Equipment (UE) IP address allocation and management, DHCP functions, termination of NAS signalling related to session management, DL data notification, traffic steering configuration for user plane function (UPF) for proper traffic routing, and the like.

Further, the AMF 132 may receive all connection and session related information from a communication device (also referred to as User Equipment, herein), and may be responsible for handling connection and mobility management tasks. Furthermore, the PCF 134 may provide unified policy framework, policy rules to CP functions, access subscription information for policy decisions in UDR. The AF 136 may check application influence on traffic routing, access NEF, and may interact with policy framework for policy control. In an embodiment, the SCP 112 may be coupled with network components supporting Short Message Service Function 138 (SMSF 138), NF Repository function 140 (NRF 140), Security Edge Protection Proxy 142 (SEPP 142), and User plane function 144 (UPF 144). The SMSF 138 may facilitate the transfer of SMS over NAS, in 5G architecture. Moreover, the SMSF 138 may conduct subscription checking as well as it may perform a relay function between the user device 108 and SMSC (Short Message Service Centre), through interaction with the AMF (Core Access and Mobility Management Function). Further, the NRF 140 may be configured to perform service discovery function, maintain NF profile and may also check available NF instances. Also, the BroadForward Security Edge Protection Proxy 142 (BroadForward SEPP 142) may facilitate a secured communication between one or more 5G networks. The SEPP 140 may also provide end-to-end confidentiality and/or integrity between source and destination network for all 5G interconnect roaming messages.

Furthermore, the UPF 144 may function to connect actual data coming over corresponding Radio Area Network (RAN) to the Internet. In an exemplary embodiment, the UPF 144 may carry out packet routing and forwarding, packet inspection, and handle Quality of Service (QoS). Further, the UPF 144 may act as external PDU session point of interconnect to Data Network (DN), and also may act as an anchor point for intra-RAT mobility as well as inter-RAT mobility. It should be noted that functioning of the SCP 112 may be independent of distance between the Network Functions. Moreover, the SCP 112 may facilitate peer-to-peer communication between peer instances/nodes. Further, basic functionality of the SCP 112 may include, but not limited to, end-to-end connectivity between different nodes having distinct deployment scenarios, architecture, and functionality while managing such architectures efficiently. Routing capability of the propose system 100 or SCP 112 may be agnostic to each node's architecture, structure, functionality, and implementation of Network Functions.

In an embodiment, the SCP controller (112) may be in communication with an at least one node 106 which may be a public land mobile network (PLMN) cluster. Each PLMN cluster may have a plurality of end points associated with the network 110. For example, the endpoints can include a plurality of user devices (108). The SCP controller (112) may further include one or more processors coupled to a memory storing instructions executable by the one or more processors. The controller (112) may be configured to receive, from one or mode source node devices 106 in communication with the SCP controller 112, a plurality of requests to be transmitted to the first and the second PLMN clusters and then determine status of a plurality of paired n number endpoint and n+2 number end point associated with the first and the second PLMN clusters respectively. For example, if n=1, the pairing will comprise of Endpoint 1 of the first PLMN cluster and endpoint 3 of the second PLMN cluster. If, n=2, the pairing will comprise of Endpoint 2 of the first PLMN cluster and endpoint 4 of the second PLMN cluster. If n=3, the pairing will comprise of Endpoint 3 of the first PLMN cluster and endpoint 5 of the second PLMN cluster.

In an embodiment, the SCP controller 112 may be further configured to route, the plurality of requests equally through the first PLMN cluster for transmitting to each said paired n number endpoint and the n+2 number endpoint associated with the first PLMN cluster and the second PLMN cluster, when the status of each said paired n number endpoint and the n+2 number endpoint is determined to be active. The plurality of requests may be routed equally to paired n number endpoint and the n+2 number endpoint associated with the first PLMN cluster and the second PLMN cluster respectively based on a round robin technique. Further, the routing may be used at any or a combination of egress and ingress proxy.

In an embodiment, the SCP controller may be configured to route the plurality of requests to only one endpoint in a pair at a time.

In an embodiment, when all the plurality of end points are active, the controller may be configured to route 50% of the plurality of requests to a first pair comprising the n number endpoint of the first PLMN cluster and the n+2 number endpoint of the second PLMN cluster while the other 50% of the plurality of requests is routed to a second pair comprising a 2n number endpoint of the first PLMN cluster and a 2n+2 number endpoint of the second PLMN cluster. For example, 50% of the plurality of requests may be routed to a first pair comprising the endpoint 1 of the first PLMN cluster and endpoint 3 of the second PLMN cluster while the other 50% of the plurality of requests is routed to a second pair comprising endpoint 2 of the first PLMN cluster and number endpoint 4 of the second PLMN cluster.

In an embodiment, when the n number end point of the first pair is inactive and the remaining end points are active, the controller may be configured to route 50% of the plurality of requests to the n+2 number endpoint of the second PLMN cluster while the other 50% of the plurality of requests is routed to the 2n number endpoint of the first PLMN cluster. For example, when the end point 1 of the first pair is inactive and the remaining end points are active, the controller may route 50% of the requests to endpoint 3 of the second PLMN cluster while the other 50% of the plurality of requests is routed to the endpoint 2 of the first PLMN cluster.

In an embodiment, when the 2n number end point of the second pair is inactive and the remaining end points are active, the controller may be configured to route 50% of the plurality of requests to the n number endpoint of the first PLMN cluster while the other 50% of the plurality of requests is routed to the 2n+2 number endpoint of the second PLMN cluster. For example, when the endpoint 2 of the second pair is inactive and the remaining end points are active, the controller may be configured to route 50% of the plurality of requests to endpoint 1 of the first PLMN cluster while the other 50% of the plurality of requests is routed to the endpoint 4 of the second PLMN cluster In an embodiment, when either or both n+2 number endpoint and the 2n+2 number endpoint of the second PLMN cluster are inactive and the remaining end points are active, the controller may be configured to route the plurality of requests equally to the n number endpoint of the first PLMN cluster and the 2n number endpoint of the first PLMN cluster. For example, when either or both endpoint 3 and the endpoint 4 of the second PLMN cluster are inactive and the remaining end points are active, the controller may be configured to route the plurality of requests equally to the endpoint 1 of the first PLMN cluster and the endpoint 2 of the first PLMN cluster.

In an embodiment, when either or both n number endpoint and the 2n number endpoint of the first PLMN cluster are inactive and the remaining end points are active, the controller is configured to route the plurality of requests equally to the n+2 number endpoint of the first PLMN cluster and the 2n+2 number endpoint of the second PLMN cluster. For example, when either or both endpoint 1 and the endpoint 2 of the first PLMN cluster are inactive and the remaining end points are active, the controller may be configured to route the plurality of requests equally to the endpoint 3 of the first PLMN cluster and the endpoint 4 of the second PLMN cluster.

In an embodiment, when both n number endpoint and the n+2 number endpoint of the first pair are inactive, the controller may be configured to route 100% of the plurality of requests to the 2n number endpoint of the first PLMN cluster. For example, when both endpoint 1 and the endpoint 3 of the first pair are inactive, the controller may be configured to route 100% of the plurality of requests to the endpoint 2 of the first PLMN cluster.

In an embodiment, when both 2n number endpoint and the 2n+2 number endpoint of the second pair is inactive, the controller is configured to route 100% of the plurality of requests to the n number endpoint of the first PLMN cluster. For example, when both endpoint 2 and the endpoint 4 of the second pair is inactive, the controller may be configured to route 100% of the plurality of requests to the endpoint 1 of the first PLMN cluster.

In an embodiment, when only one endpoint is active while remaining endpoints are inactive, the controller may be configured to route the plurality of requests routed to the only active endpoint. Further, the number of endpoints in the first PLMN cluster should be equal to the number of endpoints in the second PLMN cluster.

In an embodiment, the second PLMN cluster may be a disaster recovery (DR) cluster for the first PLMN cluster which may be an active cluster and the routing of the plurality of requests may be directly sent to an endpoint in the DR cluster if the corresponding active endpoint in the first PLMN cluster is unavailable.

In an embodiment, with O based indexing, endpoint at even index should belong to the first PLMN cluster while odd index should belong to the DR cluster.

Figure 1C:
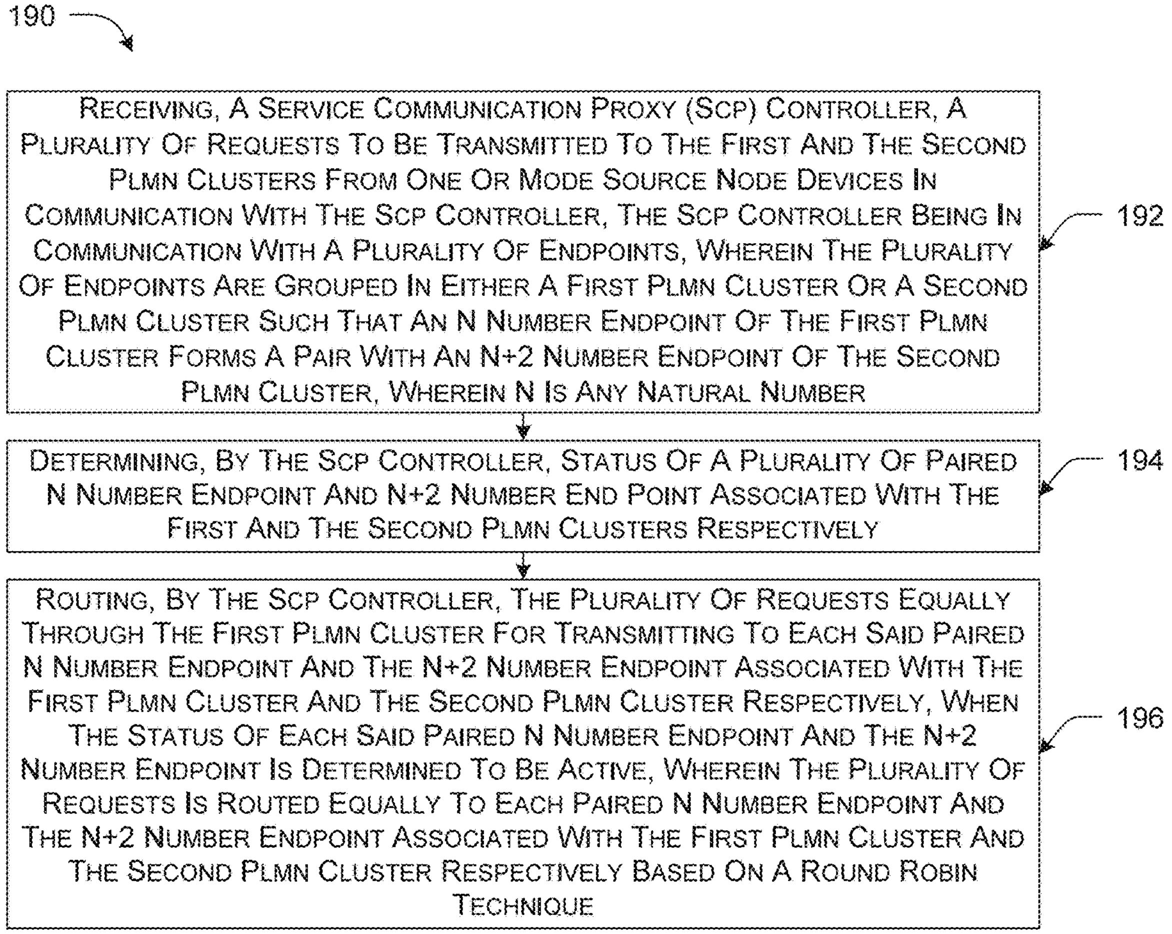
FIG. 1C illustrates an exemplary method flow diagram, in accordance with an embodiment of the present disclosure.

FIG. 1C illustrates an exemplary method flow diagram, in accordance with an embodiment of the present disclosure. The method (190) may include at 192, the step of receiving, by the SCP controller 112, from one or mode source node devices in communication with the controller, a plurality of requests to be transmitted to the first and the second PLMN clusters from one or mode source node devices in communication with the SCP controller 112. The SCP controller (112) is in communication with a plurality of endpoints that may be grouped in either a first PLMN cluster or a second PLMN cluster such that an n number endpoint of the first PLMN cluster forms a pair with an n+2 number endpoint of the second PLMN cluster, and n is any natural number.

The method (190) may also include at 194, the step of determining, by the SCP controller (112), determining, by the SCP controller (112), status of a plurality of paired n number endpoint and n+2 number end point associated with the first and the second PLMN clusters respectively.

Furthermore, the method may include at 196, the step of routing, by the SCP controller (112), the plurality of requests equally through the first PLMN cluster for transmitting to each paired n number endpoint and the n+2 number endpoint associated with the first PLMN cluster and the second PLMN cluster respectively, when the status of each paired n number endpoint and the n+2 number endpoint is determined to be active. The plurality of requests may be routed equally to each paired n number endpoint and the n+2 number endpoint associated with the first PLMN cluster and the second PLMN cluster respectively based on a round robin technique.

Figure 2:
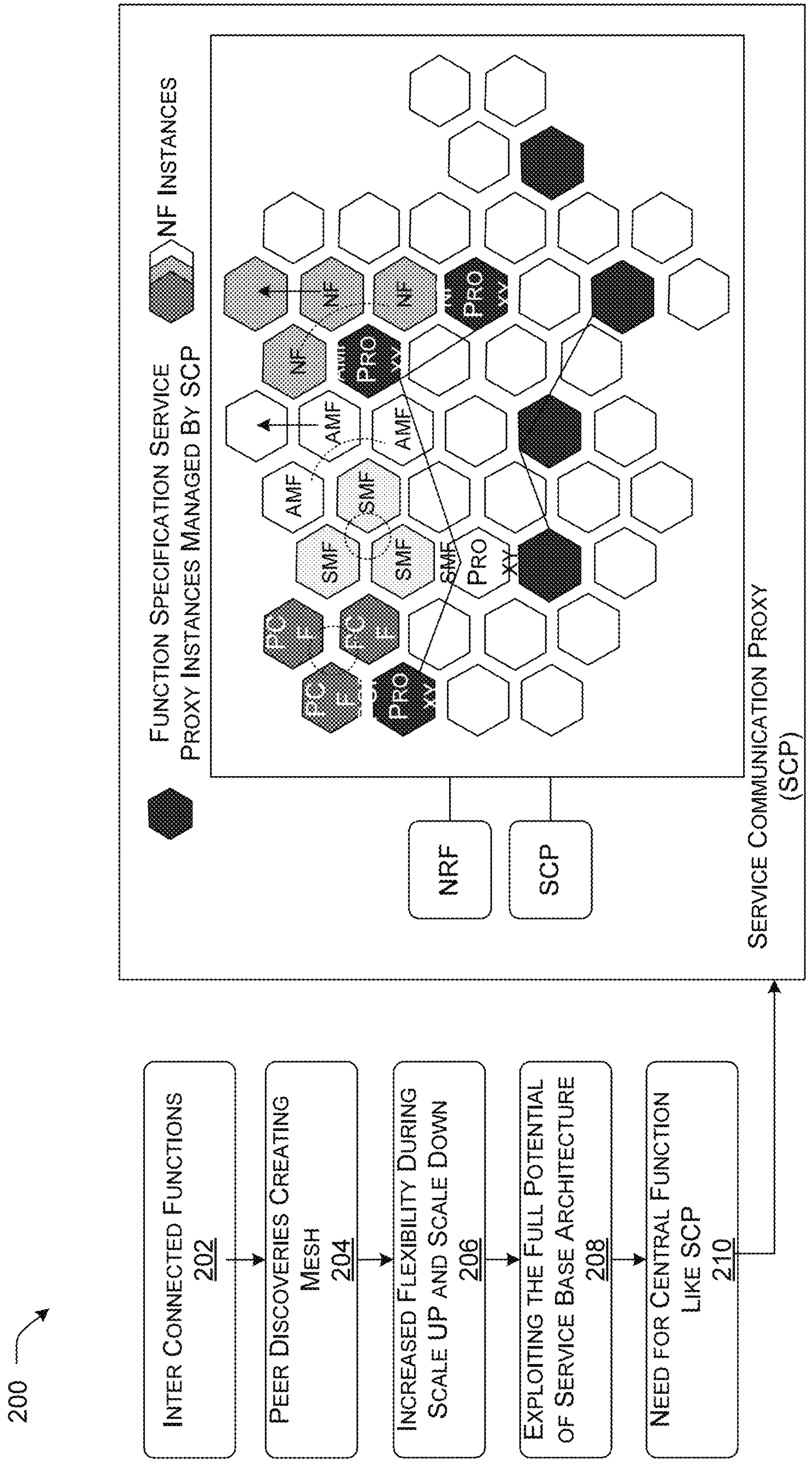
FIG. 2 with reference to FIG. 1B, illustrates an exemplary diagram of SCP implementation, in accordance with an embodiment of the present disclosure.

FIG. 2 with reference to FIG. 1B, illustrates an exemplary diagram of SCP implementation, in accordance with an embodiment of the present disclosure. FIG. 2 mainly depicts present implementation for intelligent load balancing, routing, monitoring and congestion control at application layer, i.e., Layer 7 of an open systems intercommunication (OSI) model, which may fully decouple service layer from the infrastructure layer. The SCP may not only resolve the challenges related to the 5G Service Based Architecture but may also optimize signalling controls, and thus may provide better visibility into the core network. The SCP 112 may also boost the network performance by continuously coordinating with other network functions.

In one embodiment, the system 100 may carry out, at block 202, interconnected functions, and facilitate communication, at block 204, in between peer nodes and create a mesh based on discoveries/information delivered by the peer nodes. Further, the system 100 may facilitate, at block 206, scale up and scale down functions, which may be provided with increased flexibility. Furthermore, the system 100 may enable, at block 208, exploitation of maximum potential of service-based architecture. Moreover, at block 210, the system 100 may address the need for a module with some central function, and thereby may facilitate a secured communication of the nodes 106 with the SCP 112 (of FIG. 1B). For example, SCP 112 may be configured to control the flow of data/information between the nodes by facilitating load balancing, routing, traffic monitoring, congestion control, and service discovery in the Layer 7 service Mesh. In an exemplary embodiment, the system 100 may determine Network Function (NF) instances, and correspondingly the SCP 112 may manage function specification service proxy instances. In another exemplary embodiment, the NRF 140 may provide facilities of registration, re-registration and NF discovery along with.

In another exemplary embodiment, the system 100 may include NF which may communicate with NRF 140 through SCP controller. For instance, a PCF proxy running with ‘x’ NF services and ‘y’ instances may communicate, through the SCP controller of the SCP 112, with the NRF 140, which may act as central repository and may include information about all the NFs. In another exemplary embodiment, the SCP controller may be trained to configure SCP proxies based on real-time situation. Therefore, no pre-configuration of the SCP proxies may be required in the system 100.

Figure 3A:
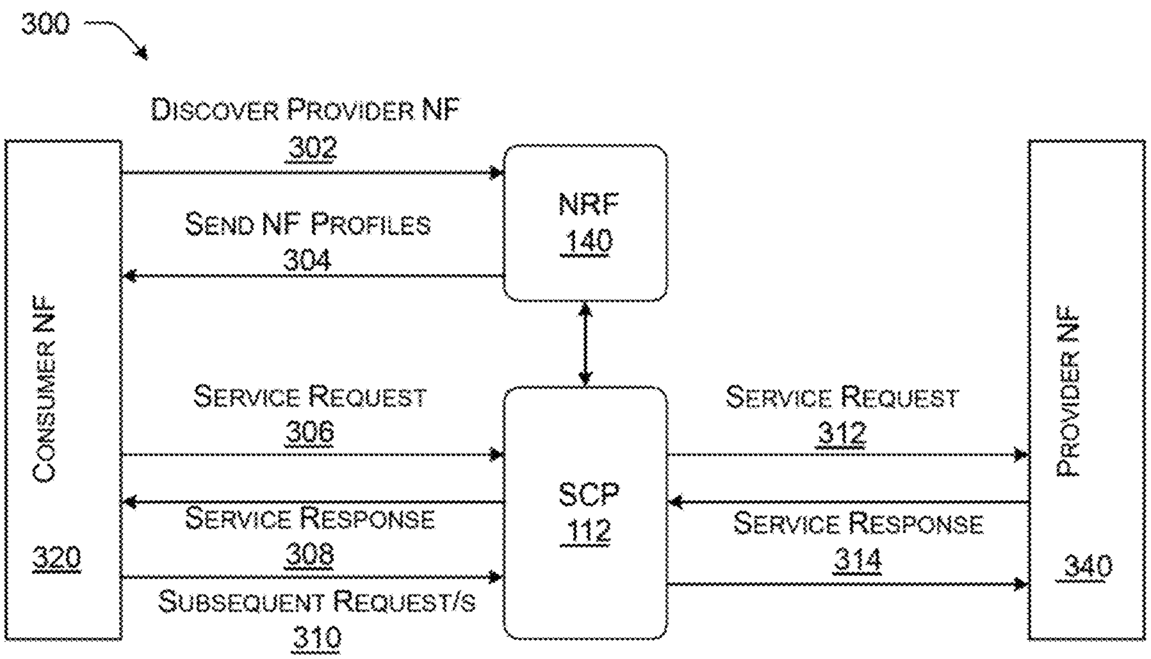
FIG. 3A illustrates exemplary representation of flow diagram illustrating indirect communication, through the proposed system, with delegated discovery, in accordance with embodiments of the present disclosure.
Figure 3B:
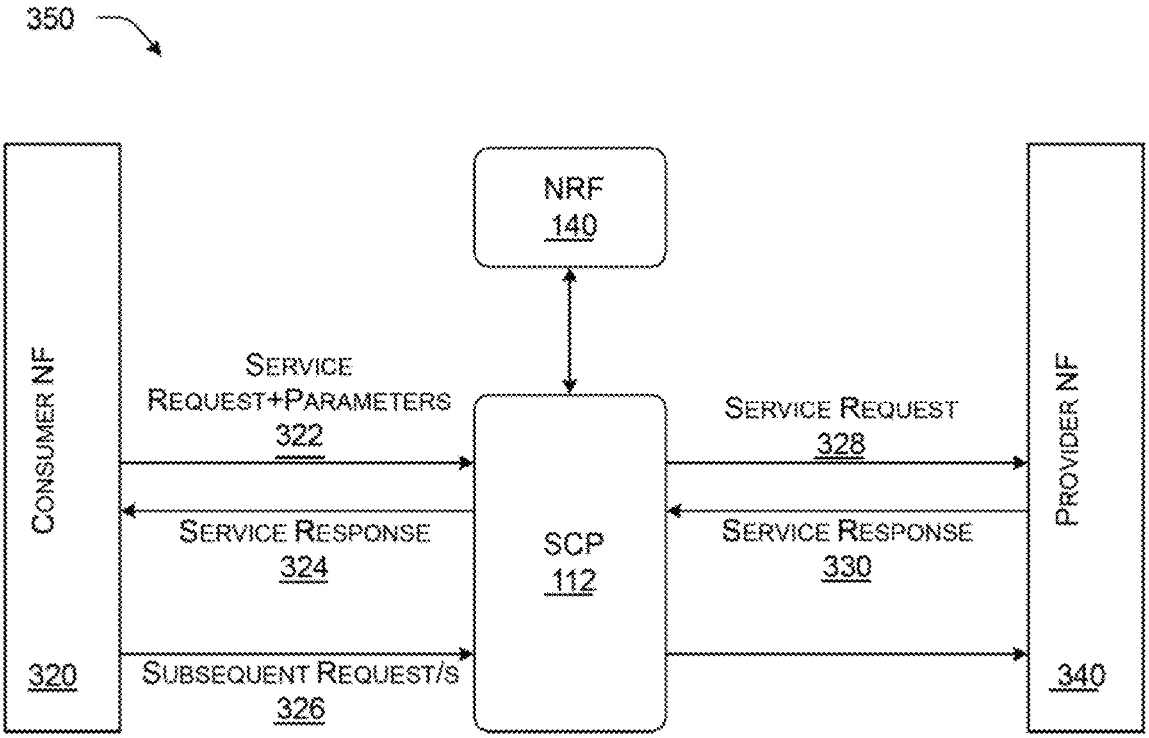
FIG. 3B illustrates exemplary representation of flow diagram illustrating indirect communication, through the proposed system, without delegated discovery, in accordance with embodiments of the present disclosure.

FIG. 3A illustrates exemplary representation of flow diagram illustrating indirect communication, through the proposed system, with delegated discovery, in accordance with embodiments of the present disclosure. FIG. 3B illustrates exemplary representation of flow diagram illustrating indirect communication, through the proposed system, without delegated discovery, in accordance with embodiments of the present disclosure. Referring to FIGS. 3A and 3B, the system 100 implements SCP 112 (of FIG. 1B) to support both the scenarios of indirect communication, i.e. indirect communication with/without delegated discovery, for discovery of the peer network functions.

- Indirect communication without delegated discovery: As shown in 302 in FIG. 3A, in this case, a consumer node or consumer NF 320 (consumer NF pertaining to UE sending the request) may query the NRF 140 directly to obtain information pertaining to NF profiles of provider node or provider NF 340 (destination node where the request needs to be sent). Based on discovery result, at 304, the NRF 140 may send NF profiles to the consumer node 320. In an example embodiment, based on discovery result, the consumer NF 320 may select an NF instance of NF Service instance set. At 306 consumer NF 320 may send the request to the SCP 112 including the address of the selected service producer pointing to a NF service instance or a set of NF service instances. In an example embodiment, the SCP 112 may possibly interact with NRF 140 to get selection parameters such as location, capacity, and other such information. At 312, the SCP 112 may route the request to the selected NF service provider instance or provider node 340. At 314, the provider NF 340 may, generate a service response, which may further be transmitted, at 316, to the consumer NF 320 through the SCP 112. Similarly, subsequent request(s) may be transmitted, at 310, which may be further processed in the same manner.
- Indirect communication with delegated discovery: This mode of communication may function even when users do not perform any discovery or selection. As shown in FIG. 3B, in this case, a consumer node or consumer NF 320 (consumer NF pertaining to UE sending the request) may not query the NRF 140 directly to obtain information pertaining to NF profiles of provider node or provider NF 340 (destination node where the request needs to be sent) shown in FIG. 3A. In an example embodiment and as shown in FIG. 3B, at 322, consumer node 320 may add any necessary discovery and selection parameters required to find a suitable provider node 340 to the service request. In an example embodiment, the SCP may perform discovery with an NRF 140 and obtain the discovery result. The SCP 112 may use the request address and the discovery selection parameters in the request message to route the request to a suitable producer instance/provider node 340 as shown in the step 328. The provider NF 340 may, in turn, generate, at 330, a service response, which may further be transmitted, at 324, to the consumer NF 320 through the SCP 112. Similarly, subsequent request(s) may be transmitted, at 326, which may be further processed in the same manner.

In an exemplary embodiment, the proposed SCP 112 may also be used for indirect communication between NFs and NF services within any or a combination of Public Land Mobile Network (PLMN) such as, for example, Visiting Public Land Mobile Network (VPLMN) and Home Public Land Mobile Network (also referred to as HPLMN).

According to an embodiment, apart from acting as a proxy or a routing agent between various Network Functions, the SCP 112 may also be configured to carry out following functionalities:

- Communication Security: The SCP platform may be configured to allow only authorised consumer NFs to communicate with the provider NF.
- Load balancing: The provider NFs may configure various load balancing techniques such as Round Robin and Weighted Scheduling, wherein in the Round Robin load balancing technique, client requests may be routed to available servers on a cyclical basis. Round robin server load balancing may work at its best when servers have roughly identical computing capabilities and storage capacity.
- Security Supporting: The SCP also supports security mechanisms between the consumers and providers of the network services.
- Traffic Monitoring: The SCP may monitor the performance of the Provider NFs in terms of number of service requests being processed.
- Traffic Prioritization: The SCP platform may be configured to give priorities to specific Consumer NFs requests against any other Consumer NFs.
- Discovery of NFs: SCP provides interfaces to identify most appropriate instances of other network functions (e.g. AUSF, PCF) for a specific UE's SUPI, SUCI or GPSI.
- Overload control: The SCP has capability to put a cap on number of authorisation on a specific instance of Provider NFs. This means, in case where number of Consumer Application reaches to a threshold limit, it will not authorise new consumer NFs.

Figure 4A:
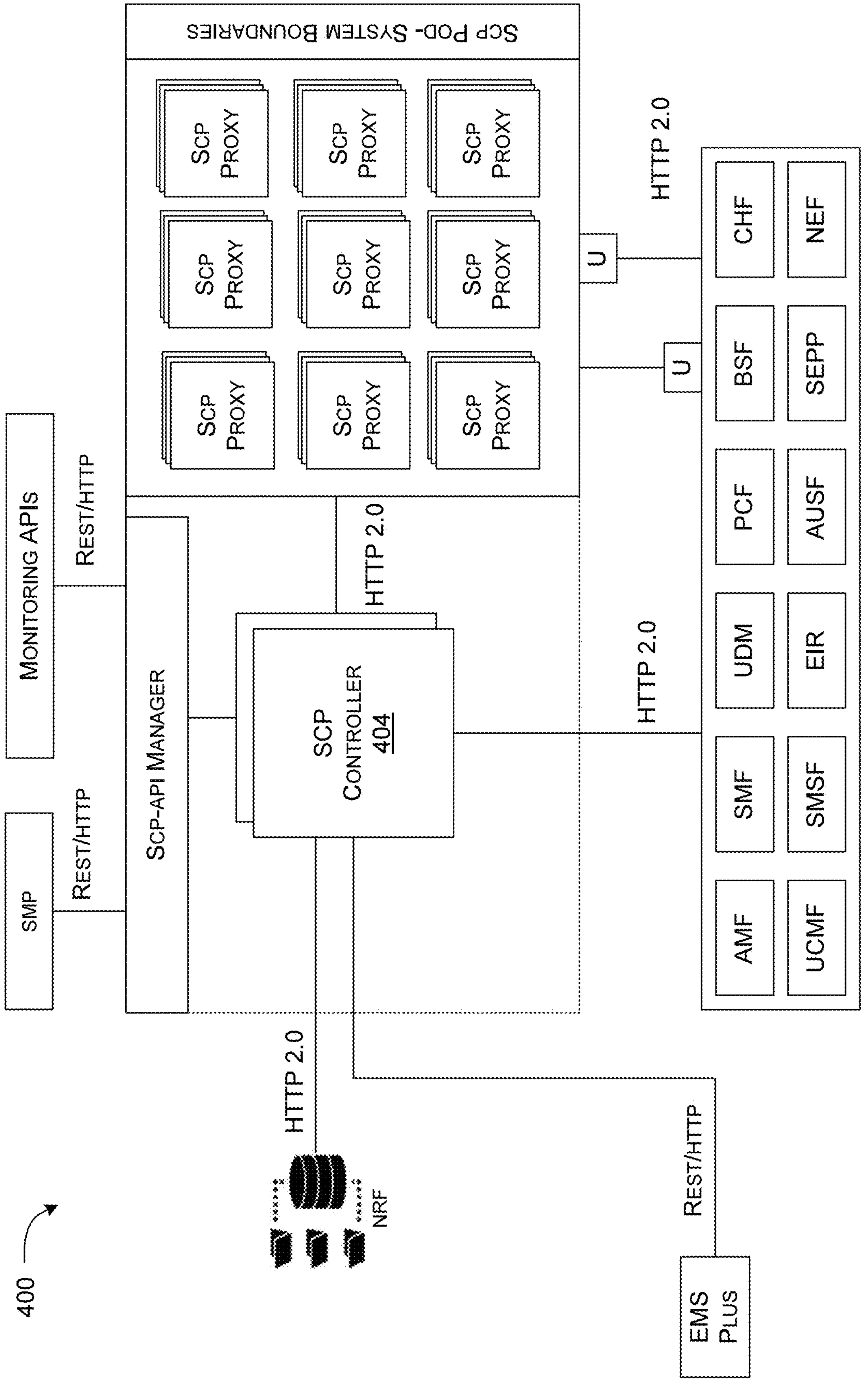
FIGS. 4A-4B illustrates exemplary representation of a system architecture of service communication proxy (SCP), in accordance with an embodiment of the present disclosure.
Figure 4B:
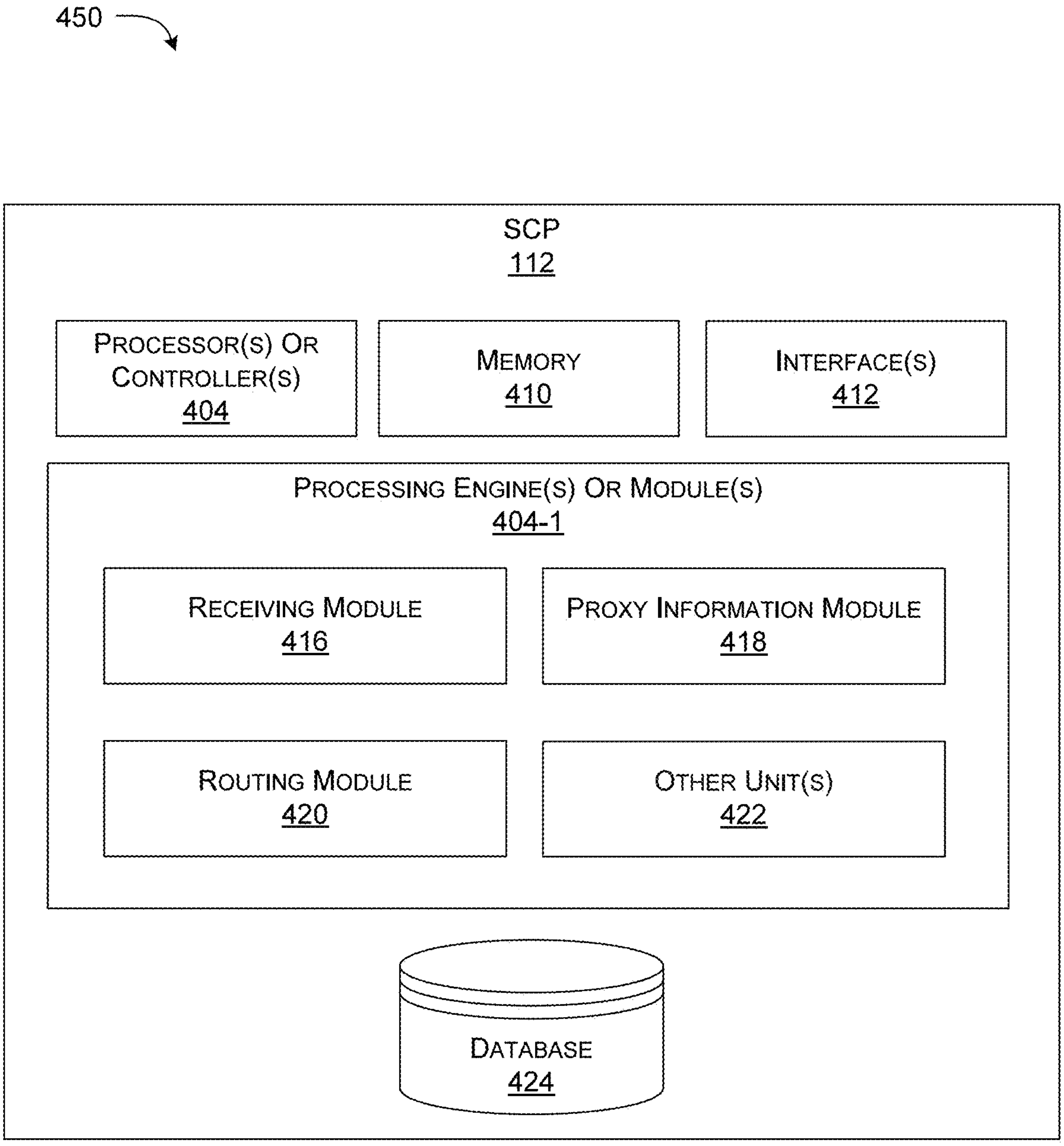

FIGS. 4A-4B illustrates exemplary representation 400 and 450 of a system architecture of service communication proxy (SCP), in accordance with an embodiment of the present disclosure. Referring to FIG. 4A, point-of-delivery (POD) may be outlined by the dashed lines and alongside are the system boundaries of the Service Communication Proxy (SCP) 112. All the other systems/components may be 3GPP defined 5G Network Functions which may include protocol interfaces with the SCP 112.

In an embodiment, the architecture of Service Communication Proxy (SCP) may include at least one of the following functionalities—

- Indirect Communication
- Delegated Discovery
- Message forwarding and routing to destination NF/NF service.
- Communication security (e.g. authorization of the NF Service Consumer to access the NF Service Producer API), load balancing, monitoring, overload control, etc.
- Optionally interact with UDR, to resolve the UDM Group ID/UDR Group ID/AUSF Group ID/PCF Group ID/CHF Group ID/HSS Group ID based on UE identity, e.g. SUPI or IMPI/IMPU.

In an embodiment, the proposed SCP 112 may include a SCP Proxy along with a SCP controller 404. In one embodiment, the SCP Proxy may be either ingress proxy or egress proxy, wherein:

- Ingress Proxy: This proxy instance ensures incoming traffic for producer NF based on configured policy default is round robin.
- Egress Proxy: This proxy instance ensures consumer's outgoing traffic flow to a right SCP Ingress proxy, and routing based on NF or SCP selection criteria.

It may be appreciated that a hybrid deployment is also possible where a single SCP Instance may act as egress as well as ingress proxy.

In an embodiment, the SCP 112 may include multiple SCP proxies as shown in FIG. 4A, which may be communicatively linked to the SCP controller 404 along with NRF, EMS Plus, SMP, APIs, and various network functions via an HTTP module. Further, the SCP controller 404 may be configured to manage all SCP proxy instances and select appropriate proxy instance as egress or ingress for target NFs during NF Registration and Discovery flow, and in order to do so the SCP Controller 404 need to deploy in front of NRF Clusters serving for multiple PLMN or Single PLMN. In an exemplary embodiment, the SCP controller 404 may configure some instances of PLMN to act as a disaster recovery (DR) endpoint for corresponding set of Active PLMN cluster endpoint.

In an embodiment, and as shown in FIG. 4B, an example architecture of the SCP 112 is shown. The SCP 112 may facilitate routing of the requests by a combination of hardware and software implementation. FIG. 4B illustrates an exemplary representation of SCP 112 of FIG. 1B, in accordance with an embodiment of the present disclosure. The SCP 112 may include one or more processors or controllers (for example, SCP controller 404 as shown in FIG. 4A). The one or more processor(s) or controller(s) 404 may be coupled with a memory 410. The memory 410 may store instructions which when executed by the one or more processors or controller(s) 404 may cause the SCP 112 to perform the steps as described herein.

In an embodiment, the processor(s) or controller(s) 404 may enable routing of requests from a consumer node (pertaining to a user device sending the request) to a destination mode (or provider node). For example, the processor(s) or controller(s) 404 of the SCP 112 may identify/configure at least one endpoint or node, prior to routing the request. In this example, the identification of available endpoints in a cluster of endpoints may be done, wherein the cluster may pertain to, for example, an active cluster and a DR cluster. In an example embodiment, the request may be routed to the identified/configured pair if at least one endpoint in the pair may be functional. The active cluster may include active endpoints to which request may be preferably routed if the endpoint may be available. The DR cluster may include DR endpoints, wherein the DR endpoints may be considered an alternative endpoint for routing the request if the corresponding active endpoint may be un-available or non-functional. In an example embodiment, as per the active-standby policy, the endpoints in the active and DR clusters may be paired to form a pair of endpoints. The pairwise configuration/identification may be performed prior to the routing, which may enable effective management of the incoming requests. This may also enable to pre-plan the routing directly to DR endpoint (in the DR cluster) if the corresponding active endpoint (in active cluster) may be unavailable. In an alternate embodiment, multiple endpoints in active cluster may be paired to a single DR endpoint.

In an example embodiment, the identification/configuration of pair of endpoints may be performed based on pre-defined policy of the SCP 112. For example, the pre-defined policy may pertain to active standby implementation, which is explained herein. For example, the processor(s) or controller(s) 404 may evaluate when an endpoint of the active cluster, for example, a first endpoint is unavailable and may be able to configure a corresponding endpoint in DR cluster, prior to routing the request. In another example, the processor(s) or controller(s) 404 may evaluate when an endpoint, for example, a first endpoint of an active cluster is unavailable and also may be able to also evaluate if the corresponding DR endpoint (second endpoint) pertaining to the first endpoint is unavailable so that the request may not be routed at all to the first endpoint. This may save unnecessary re-routing and may also facilitate effective routing steps. In an example embodiment, the identification/configuration of pair of endpoints may be performed based on a pre-defined criteria. For example, the pre-defined criteria may pertain to, for example, header routing criteria, which may enable the processor(s) or controller(s) 404 of the SCP 112 to decide which endpoints to be selected (prior to routing) based on the availability. Various other examples are provided in the following sections, although the present disclosure may not be limited by these examples. In an example, the header routing criteria may include, but not limited to, at least one of:

a) 3gpp-sbi-discovery
b) 3gpp-sbi-target-apiroot
c) 3gpp-sbi-binding/3gpp-sbi-routing-binding In an example embodiment, if multiple pre-defined criteria or header routing criteria may be considered, the processor(s) or controller(s) 404 may be able to prioritize the pre-defined criteria to enable appropriate selection/identification/configuration of endpoints prior to routing of the request. Various other embodiments may be possible.

The SCP implementation may pertain to ingress node and/or egress node. In case of ingress node implementation, the NF Profile used for registration may include multiple of 2 endpoints and in correct sequence. In an example embodiment, O based indexing may be used such that endpoint at even index should belong to active cluster while odd index should belong to DR cluster.

The processor(s) or controller(s) 404 may be implemented as one or more microprocessors, microcomputers, microcontrollers, digital signal processors, central processing units, logic circuitries, and/or any devices that process data based on operational instructions. Among other capabilities, the processor(s) or controller(s) 404 may be configured to fetch and execute computer-readable instructions stored in a memory 410 of the SCP 112. The memory 410 may be configured to store one or more computer-readable instructions or routines in a non-transitory computer readable storage medium, which may be fetched and executed to create or share data packets over a network service. The memory 410 may comprise any non-transitory storage device including, for example, volatile memory such as RAM, or non-volatile memory such as EPROM, flash memory, and the like.

In an embodiment, the SCP 112 may include an interface(s) 412. The interface(s) 412 may comprise a variety of interfaces, for example, interfaces for data input and output devices, referred to as I/O devices, storage devices, and the like. The interface(s) 412 may facilitate communication of the SCP 112. The interface(s) 412 may also provide a communication pathway for one or more components of the SCP 112. Examples of such components include, but are not limited to, processing engine(s) or modules 404-1 and a database 424.

The processing engine(s) or modules 404-1 may be implemented as a combination of hardware and programming (for example, programmable instructions) to implement one or more functionalities of the processing engine(s) or modules 404-1. In examples described herein, such combinations of hardware and programming may be implemented in several different ways. For example, the programming for the processing engine(s) or modules 404-1 may be processor executable instructions stored on a non-transitory machine-readable storage medium and the hardware for the processing engine(s) or modules 404-1 may comprise a processing resource (for example, one or more processors), to execute such instructions. In the present examples, the machine-readable storage medium may store instructions that, when executed by the processing resource, implement the processing engine(s) or modules 404-1. In such examples, the SCP 112 may comprise the machine-readable storage medium storing the instructions and the processing resource to execute the instructions, or the machine-readable storage medium may be separate but accessible to the SCP 112 and the processing resource. In other examples, the processing engine(s) or modules 404-1 may be implemented by electronic circuitry.

In an embodiment, the processor(s) or controller(s) 404 may pertain to an ingress controller to enable processing/controlling one or more aspects of received incoming request at an ingress node (entry point) of SCP 112. In another embodiment, the processor(s) or controller(s) 404 may pertain to an egress controller to enable processing/controlling one or more aspects of request that are being routed at an egress node (exit point) of SCP 112. In yet another embodiment, the processor(s) or controller(s) 404 may pertain to an integrated controller including both ingress and egress controller to enable processing/controlling one or more aspects of received incoming request at an ingress node (entry point) of SCP 112 and/or to enable processing/controlling one or more aspects of request that are being routed at an egress node (exit point) of SCP 112.

The processing engine or modules 404-1 of the SCP 112 may include one or more components (as shown in FIG. 4B) including receiving module 416, proxy information module 418, routing module 420 and other modules or components 422. In an embodiment, the receiving module 416 may enable to receive an incoming request from a consumer node through an ingress controller, and the routing module 420 may enable to route the request through the egress controller to the provider node. The proxy information module 418 may enable to collect or store an information pertaining to available proxy or endpoints pertaining to active and/or DR cluster. The other modules or components 422 may include, but not limited to, ingress module (pertaining to ingress node), egress module (pertaining to egress node), load balancer, edge router configuration module, mapping module (to map endpoints pertaining to active and/or DR cluster), request processing module, error message generation module and other modules or engines. Various other functions of the components may be possible. In an embodiment, database 210 may comprise data that may be either stored or generated as a result of functionalities implemented by any of the components of the processing engine(s) modules 404-1 of SCP 112.

Figure 5:
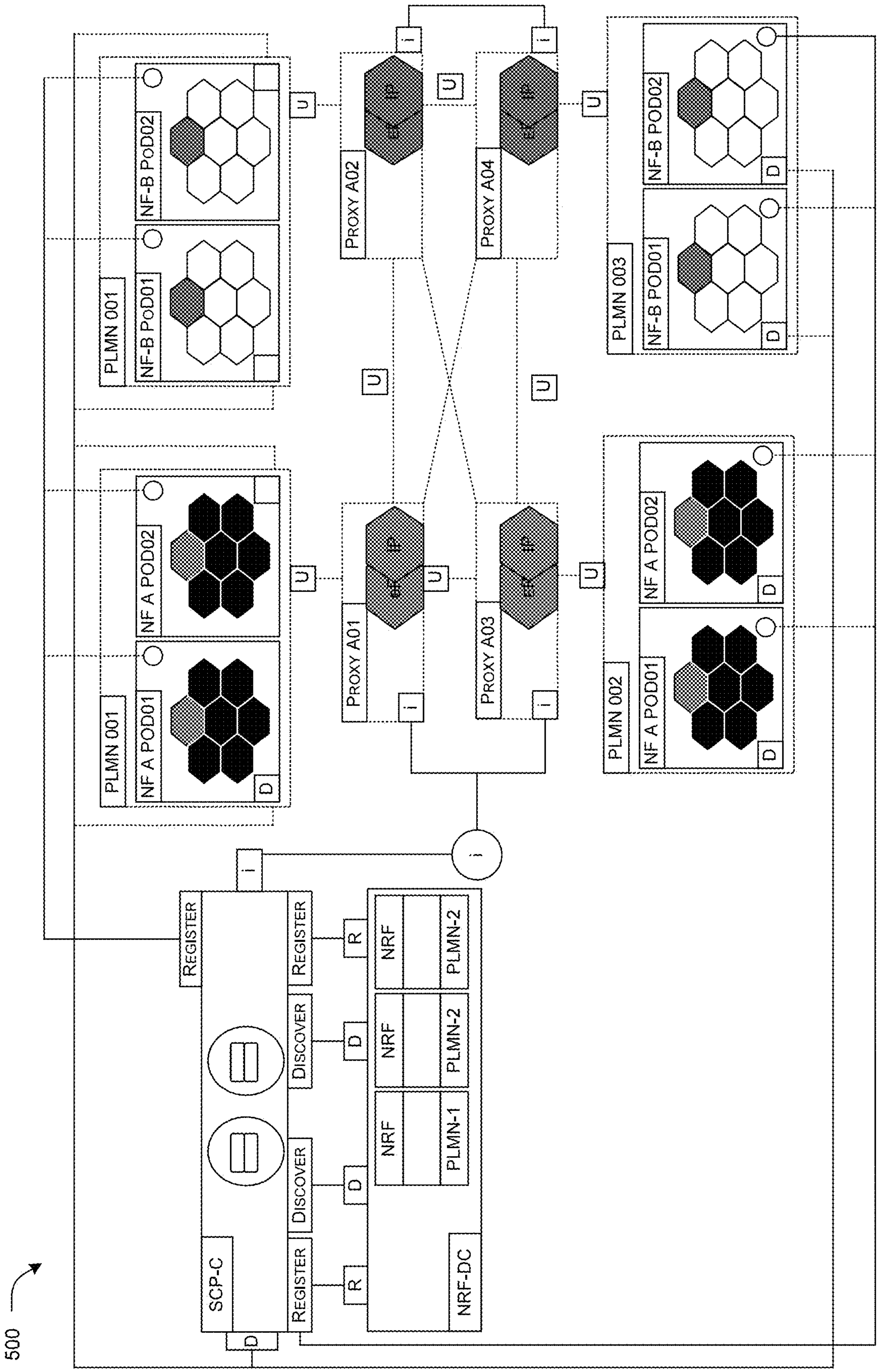
FIG. 5 illustrates an exemplary overview of SCP deployment based on the 5G functionality and SCP being deployed in independent deployment units, in accordance with an embodiment of the present disclosure.

FIG. 5 illustrates an exemplary overview of SCP deployment based on the 5G functionality and SCP being deployed in independent deployment units, in accordance with an embodiment of the present disclosure. Referring to FIG. 5, an overview of SCP deployment is illustrated, wherein the SCP deployment may be based on the 5G functionality and SCP may be deployed in independent deployment units. Further, the system 100 may be designed in a way that it may support:

One SCP Proxy instance for Single NF Type considered for one PLMN,

One SCP Proxy instance for Multiple NF Type considered for One PLMN,

One SCP Proxy instance for Multiple NF Type considered for multiple PLMN,

Multiple Proxies in Single PLMN for Multiple NF Types, and

Single SCP Controller for Multiple NRF instances considered for Multiple PLMN.

In an embodiment, the system 100 may be configured to provide different types of routing techniques for an SCP Proxy, where the routing techniques may be implemented as per requirement of different NF Team and their GR/DR handling. In one embodiment, ingress active standby routing technique may be used at an ingress proxy whereas the egress active standby routing technique may be used at an egress proxy. In these routing technique, GR or DR cluster may be defined based upon PLMN-list. In an example, the proposed active standby routing technique may also be integrated with other policies, such as, Active-Active routing policy, which may ensure utilizations of all endpoints in active cluster first.

Figure 6:
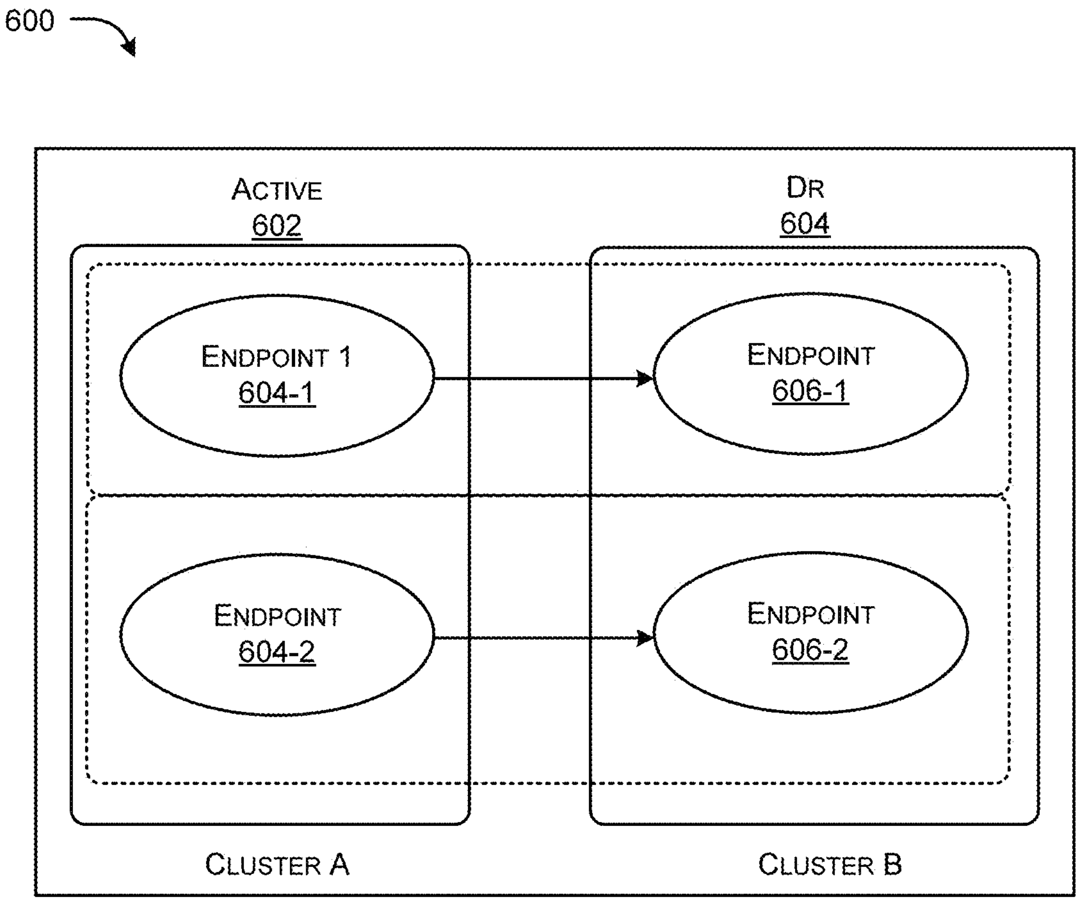
FIG. 6 illustrates an exemplary representation showing a deployment architecture of an active standby technique, in accordance with an embodiment of the present disclosure.

FIG. 6 illustrates an exemplary representation 600 showing a deployment architecture of an active standby technique, in accordance with an embodiment of the present disclosure. In an exemplary embodiment, as illustrated in FIG. 6, prior to routing the request, the SCP 112 (of FIG. 4A), may enable identification/configuration of pair of endpoints in cluster pertaining to, for example, an active cluster and a DR cluster. The active endpoint may be assigned or pertain to a corresponding DR endpoint to form a pair of endpoints. In an example, the pair of endpoints may include the active endpoint and corresponding DR endpoint in two different clusters. In an example embodiment, the routing of requests, based on identification/configuration of pair of endpoints, may be performed based on pre-defined policy (or routing policy) of the SCP 112, for example, active standby implementation.

In an example embodiment, the routing policy i.e. the active standby routing policy may be used at egress proxy and/or ingress proxy. In an example embodiment, as in the mentioned active standby routing policy, endpoint details may be configured pair wise, so at a given time only one endpoint in the pair may receive the request. In an example, the total received requests may be subjected to round robin between the pairs of endpoints.

As shown in FIG. 6, each cluster may include 2 configured endpoints. For example, clusters may be defined within the network, for instance, Cluster A and Cluster B. In this example, Cluster A may act as Active cluster 602, and may include configured endpoints i.e. endpoint 1 (604-1) and endpoint 2 (604-2), while Cluster B may be a DR cluster 608 and may include endpoint 3 (606-1) and endpoint 4 (606-2). In this routing policy of active standby implementation, as pairwise configuration may be applied, in this example, two pairs may be considered, for example, pair 1 in which the endpoint 1 (604-1) of active cluster A may be paired with endpoint 3 (606-1) of DR cluster B. Similarly, pair 2 may be considered in which the endpoint 2 (604-2) of active cluster A may be paired with endpoint 4 (606-2) of DR cluster B. In a normal scenario, assuming all endpoints may be available or functioning, 50% of total request received by SCP 112 may be routed to pair 1 while the remaining 50% may be routed to pair 2. However, in case when at least one of the endpoints may not be functioning or may be unavailable for routing, the SCP 112 may enable dynamic routing of the request by identification/configuration of pair of endpoints in active and/or DR clusters for evaluating status of the endpoint. Various possible scenarios are discussed herein below:

Example scenario 1—When all endpoints (Endpoint 1, Endpoint 2, Endpoint 3, Endpoint 4) are available or functioning In this example, the 50% of the total request (or traffic) may be sent to endpoint 1 while the other 50% request may be sent on endpoint 2.

Example scenario 2—When Endpoint 1 is down while other 3 endpoints are up

In this case the 50% of the total requests may go on Endpoint 3 while the remaining 50% request may go on Endpoint 2

Example scenario 3—When Endpoint 2 is down while other 3 endpoints are up

In this case the 50% of the total requests may go on Endpoint 1 while other 50% request may go on Endpoint 4.

Example scenario 4—When either or both Endpoint 3 and Endpoint 4 are down

In this case the requests may be routed as usual between Endpoint 1 and Endpoint 2 in equal proportion.

Example scenario 5—When both Endpoint 1 and Endpoint 2 are down

In this case, the requests may be routed between Endpoint 3 and Endpoint 4 in equal proportion.

Example scenario 6—When Endpoint 1 and Endpoint 3 are down

In this case 100% request may be routed to Endpoint 2.

Example scenario 7—When Endpoint 2 and Endpoint 4 are down

In this case 100% request may be routed to Endpoint 1.

Example scenario 8—When only one endpoint is up while other 3 endpoints are down In this case, all requests may be routed to the only active endpoint.

It may be appreciated that the above scenarios are exemplary and the present disclosure may not be limited to the mentioned examples. Further, it may also be appreciated that although only 2 endpoints are shown in each cluster, the number of clusters may not be limited to 2. It may also be appreciated that mentioned routing policy includes active and DR clusters that have same number of endpoints to avoid a scenario in which DR endpoints may be up but still SCP may not available to route request. In an alternate example embodiment, the pairwise configuration may also consider pairing multiple endpoints in active cluster with a single endpoint in DR cluster. This may enable effective utilization of the DR endpoints.

Figure 7A:
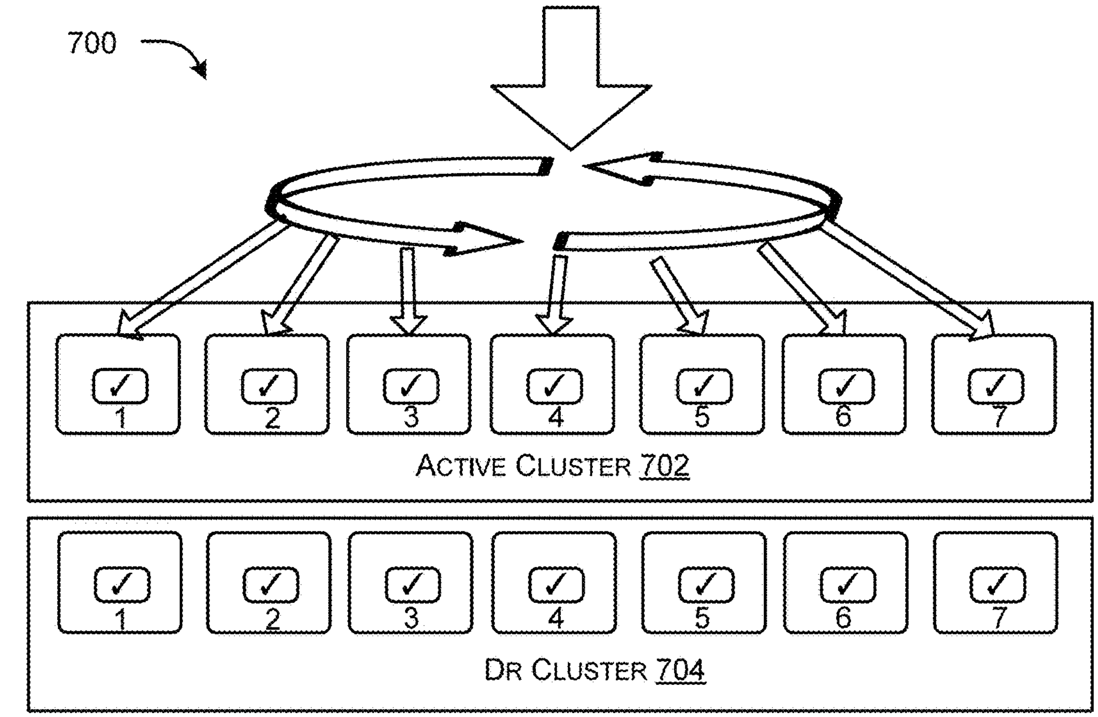
FIGS. 7A-7C illustrate exemplary representation showing functioning of the active standby policy implementation based on different status of the endpoints in an active cluster 702 and a DR cluster 704, in accordance with an embodiment of the present disclosure.
Figure 7B:
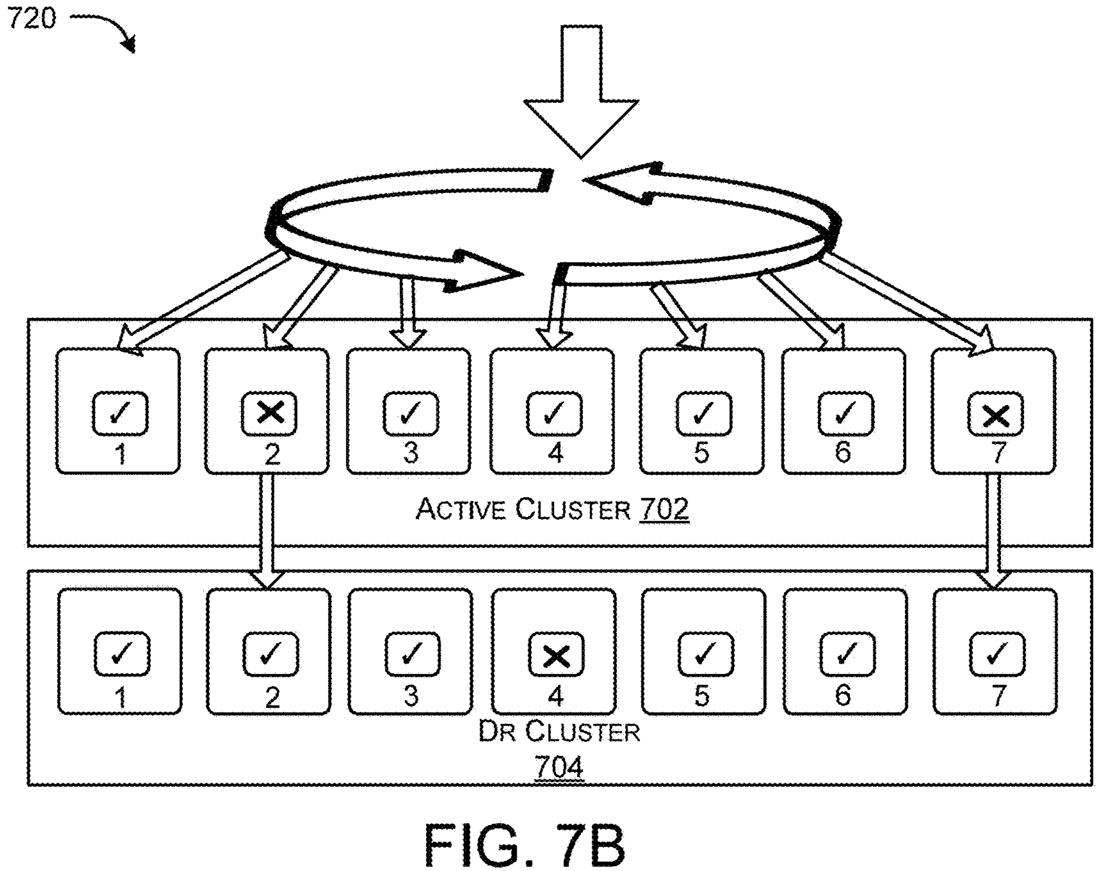
Figure 7C:
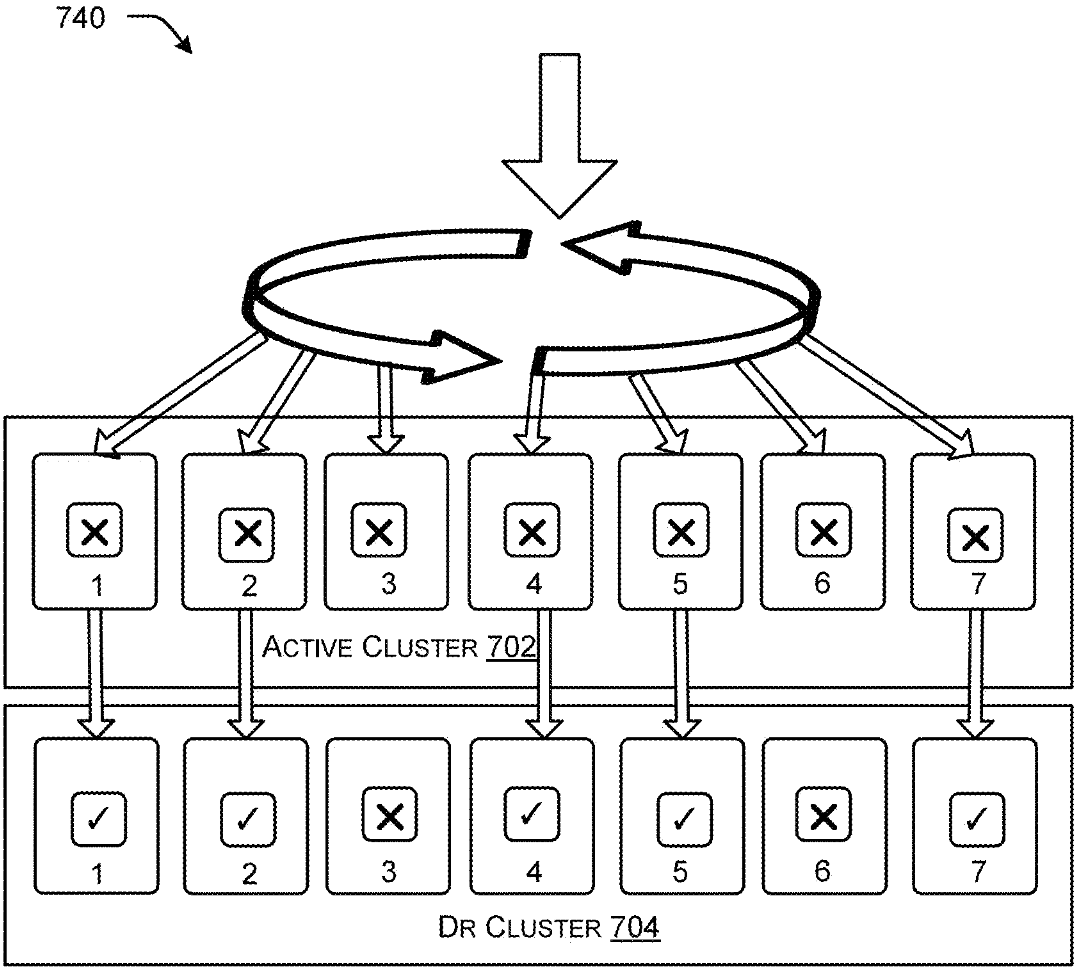

FIGS. 7A-7C illustrate exemplary representation 700, 720 and 740 respectively, showing functioning of the active standby policy implementation based on different status of the endpoints in an active cluster 702 and a DR cluster 704, in accordance with an embodiment of the present disclosure. In an example embodiment, and as shown in 700 in FIG. 7A, all the endpoints (1-7) in the active cluster 702 and the DR cluster 704 may be active (marked with tick sign). Further, the numeral assigned to endpoint in active cluster 702 is similar to numeral assigned to corresponding endpoint in the DR cluster 704. For sake of understanding, the numerals may be assigned similar numerals to indicate the respective pairing of the endpoints in cluster 702 and cluster 704. It may be appreciated that the numbers 1-7 may be only provided for sake of simplicity, however, the clusters may not be limited to 7 endpoints. Upon receiving one or more requests, it may be checked if all the end points at the active cluster 702 are functioning/available. As illustrated in FIG. 7A, since all the endpoints in the active cluster 702 are found to be active, 100% of the traffic may be routed to active cluster 702 such that the obtained request may be transmitted and distributed over all the endpoints of the active cluster 702.

In another example embodiment, and as shown in 720 FIG. 7B, some of the endpoints in the active cluster 702 and the DR cluster 704 may be active (marked with tick sign), while some may be unavailable or not functioning (marked with cross sign). For example, endpoints 2 and 7 in active cluster 702 may not be functioning and endpoint 4 in DR cluster 704 may not be functioning. Upon receiving one or more requests at SCP, it may be checked if all the end points at the active cluster 702 are functioning/available. As mentioned, since some of the endpoints in the active cluster 702 may be found to be active, the traffic may be routed to those available endpoints of the active cluster 702 (such as endpoints, 1, 3, 4, 5 and 6). However, as the endpoints 2 and 7 of the active cluster 702 are not available/functioning endpoints, the traffic or request may be sent to the endpoints 2 and 7 of the DR cluster 704 instead of the endpoints 2 and 7 of active cluster 702. It may also be observed that even though endpoint 4 of DR cluster 704 may be inactive, but as the corresponding active cluster endpoint is active, so the non-functional endpoint at DR cluster may not affect the traffic distribution.

In another example embodiment, and as shown in 740 FIG. 7C, none of the endpoints in the active cluster 702 may be available (marked with cross sign), while some endpoints in the DR cluster 704 may be available (marked with tick sign). For example, endpoints 1, 2, 4, 5 and 7 in DR cluster 704 may be functioning, whereas endpoints 3 and 6 in DR cluster 704 may not be functioning. Upon receiving one or more requests at SCP, it may be checked if all the end points at the active cluster 702 are functioning/available. As mentioned, since none of the endpoints in the active cluster 702 may be found to be available, the traffic may be routed to those paired endpoints of the DR cluster 704 (such as endpoints, 1, 2, 4, 5 and 7) that are active. However, as the endpoints 3 and 6 of the DR cluster 704 may not available/functioning endpoints, the traffic or request may not be sent to these endpoints. Therefore, the proposed system 100/SCP 112 may resolve issues such as, but not limited to, congestion control, traffic prioritization, and overload control, and thereby may also enable to effectively utilize resources and manage traffic pertaining to requests.

Figure 8A:
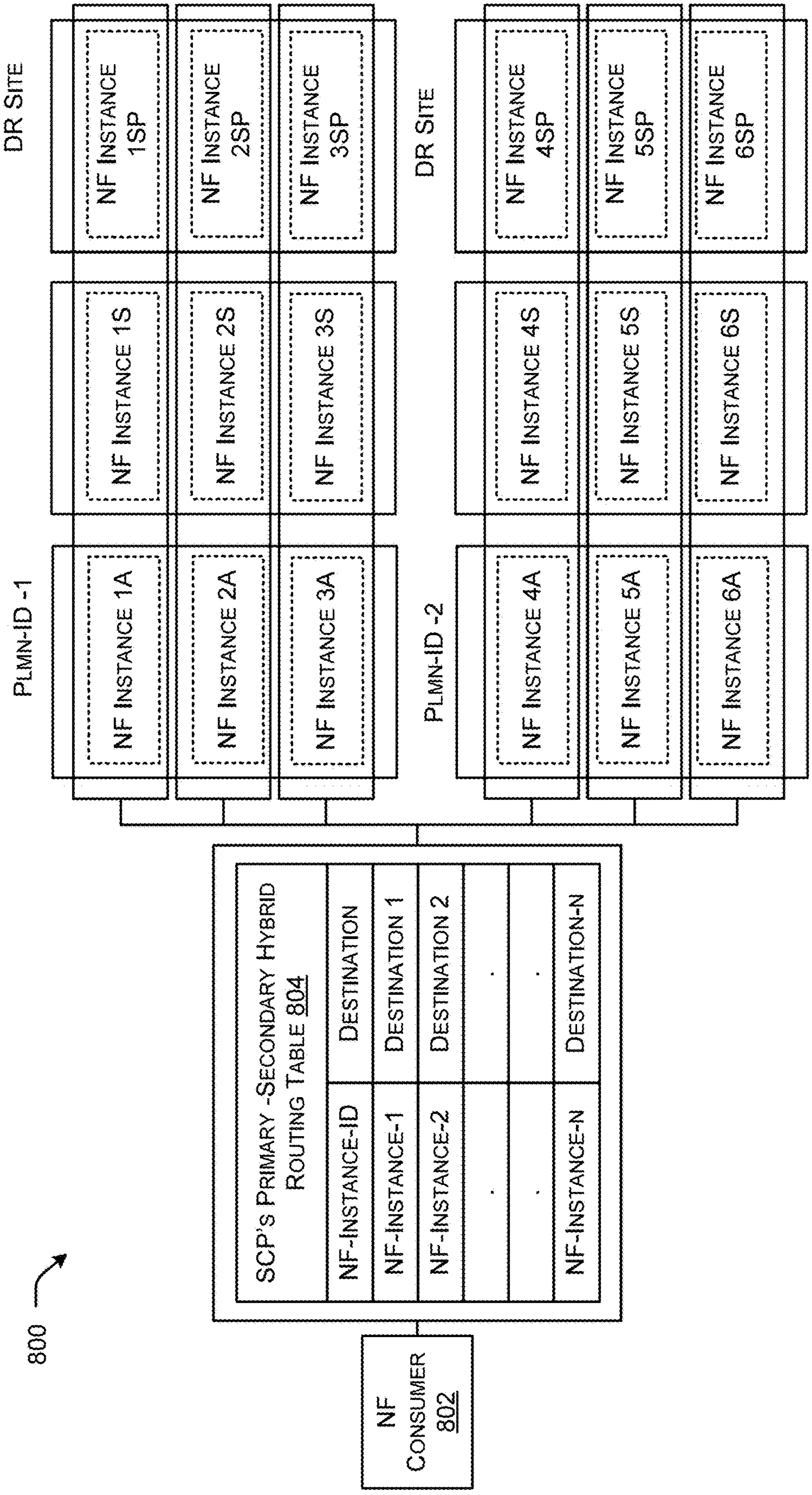

FIGS. 8A-8B illustrate exemplary representations showing tabular data or information pertaining to active standby routing, in accordance with an embodiment of the present disclosure. As shown in 800, in FIG. 8A, for a consumer node 802, SCP of the present disclosure may enable processing an active standby spare routing table 804 indicating various NF instances in terms of information pertaining to the PLMN ID and destination node. In an example, for enabling pairwise configuration of endpoints in active cluster and DR cluster, the SCP may enable to perform identification/configuration of pair of endpoints. The routing table 804 and the corresponding adjacent elaborated table indicates various NF instances and the corresponding PLMN-id for endpoints in active and DR clusters. In an example embodiment, and as shown in FIG. 8B, an exemplary representation shows that the routing of the requests may be based on corresponding PLMN-id and context. In an example embodiment, the routing of the requests may be based on corresponding PLMN-id and NF type. In an example embodiment, the routing of the requests may be based on corresponding context. In an example embodiment, the routing of the requests may be based on corresponding NF instance ID. In an example embodiment, the routing of the requests may be based on corresponding NF set ID. In an example embodiment, the routing of the requests may be based on corresponding NF service set ID. In an example embodiment, the routing of the requests may be based on NF service instance ID. Various other embodiments may be possible.

Figure 9:
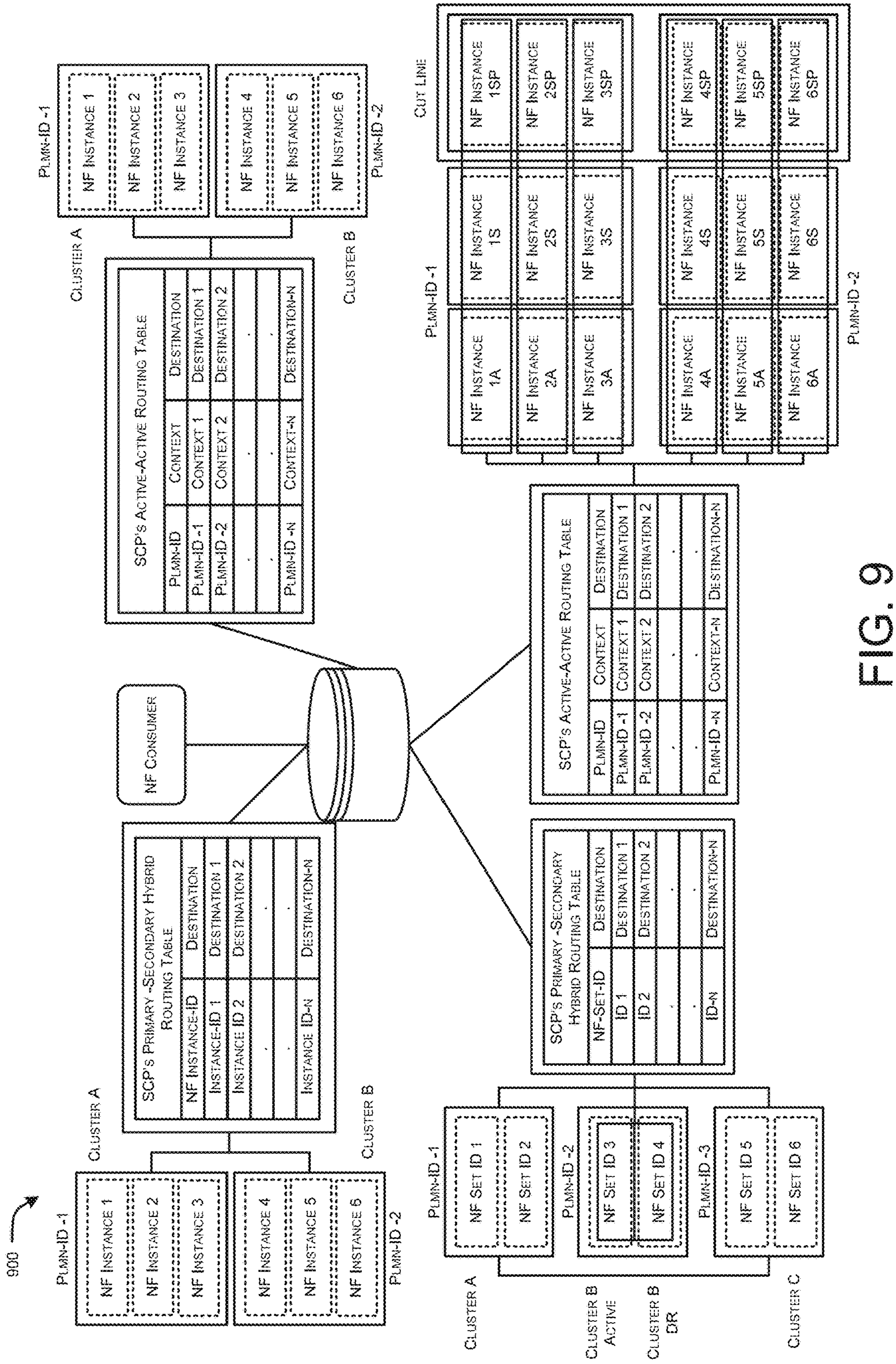
FIG. 9 illustrate exemplary representation showing an integrated implementation including various routing policies, in accordance with an embodiment of the present disclosure.

FIG. 9 illustrate exemplary representation 900 showing an integrated implementation including various routing policies, in accordance with an embodiment of the present disclosure. As shown in FIG. 9, for a consumer node 902, a system or SCP 112 may enable an integrated implementation includes various routing policies, which may be used for deciding a particular routing of request. For example, a table 904 shows the routing based on active standby routing policy of SCP including routing between pairwise configured endpoints in active cluster and DR cluster as described hereinabove. In another example, a table 906 shows the routing based on active-active routing policy of SCP including routing between endpoints within an active cluster to ensure that all endpoints in the active cluster may be effectively utilized. In another example, a table 908 shows the routing based on primary-secondary routing policy of SCP including routing between endpoints within primary and secondary clusters, wherein primary cluster may be used in priority over secondary cluster such that only upon verifying that all primary clusters are unavailable, endpoints in secondary cluster may be used for routing. In another example, a table 910 shows the routing based on hybrid primary-secondary routing policy of SCP including routing between endpoints within primary and secondary clusters, based on active and standby modes.

Figure 10:
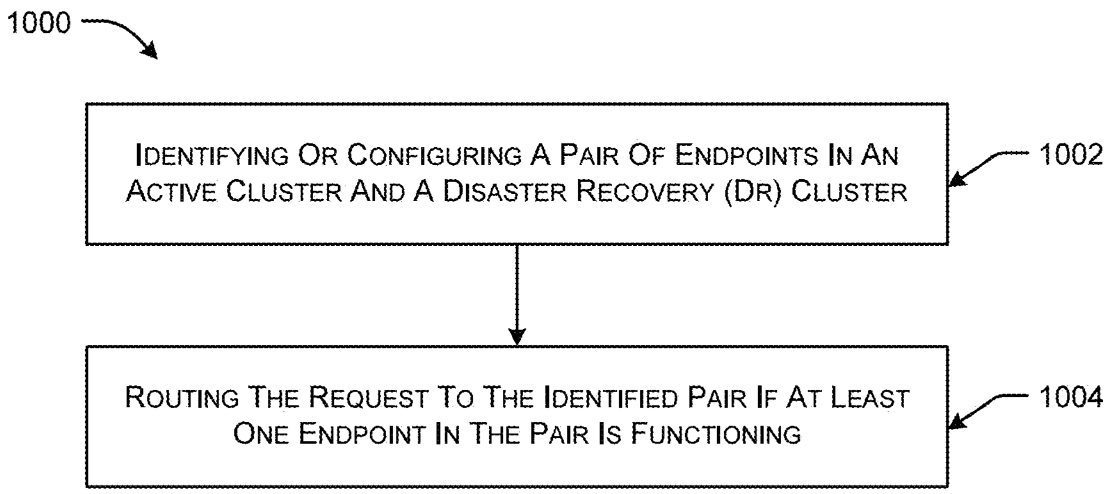
FIG. 10 illustrates an exemplary representation of flow diagram for facilitating routing a communication request using SCP based on active-standby policy, in accordance with an embodiment of the present disclosure.

FIG. 10 illustrates an exemplary representation of flow diagram 1000 for facilitating routing a communication request using SCP, in accordance with an embodiment of the present disclosure. The flow diagram 1000 may represent a general sequence of steps in case of outgoing communication or incoming communication. At 1002, the method may include a step of identifying at least one available endpoint in a cluster. At 1004, the method may include a step of routing of the communication request from the consumer node (pertaining to a user device sending the request) to a destination mode or provider node (pertaining to user device receiving the request, wherein the request may be routed to the identified/configured pair if at least one endpoint in the pair may be functional.

In an example, identifying at least one available endpoint may include an identification/configuration of pair of endpoints pertaining to, for example, an active cluster and a DR cluster. The active cluster may include active endpoints to which request may be preferably routed if the endpoint may be available. The DR cluster may include DR endpoints, wherein the DR endpoints may be considered an alternative endpoint for routing the request if the corresponding active endpoint may be un-available or non-functional. In an example embodiment, each endpoint in active cluster may be paired with a corresponding endpoint in the DR cluster to form a pair of endpoints. In an embodiment, method may enable to identify/configure pair of endpoints in active and DR clusters, for example, DR endpoints for an unavailable/non-functional endpoint in the active cluster. This may be done prior to the routing is performed, which may enable effective management of the incoming requests. This may also enable to pre-plan the routing directly to DR endpoint (in the DR cluster) if the corresponding active endpoint (in active cluster) may be unavailable.

In an example embodiment, the routing, based on identification/configuration of pair of endpoints, may be performed based on pre-defined policy of the SCP 112. For example, the pre-defined policy may pertain to active standby implementation, which is explained herein. In an example embodiment, the request may be routed to the identified/configured pair if at least one endpoint in the pair may be functional. For example, the method may include evaluating when an endpoint of the active cluster, for example, a first endpoint is unavailable and may be able to configure a corresponding endpoint in DR cluster, prior to routing the request. In another example, the method may include evaluating when an endpoint, for example, a first endpoint of an active cluster is unavailable and also may be able to also evaluate if the corresponding configured DR endpoint (second endpoint) pertaining to the first endpoint is also unavailable so that the request may not be routed at all to the pair. This may save unnecessary re-routing and may also facilitate effective routing steps. In an example embodiment, the routing, based on identification/configuration of pair of endpoints may be performed based on a pre-defined criteria. For example, the pre-defined criteria may pertain to, for example, header routing criteria, which may enable SCP 112 to decide which endpoints to be selected (prior to routing) based on the availability. Various other examples are provided in the following sections, although the present disclosure may not be limited by these examples. In an example, the header routing criteria may include, but not limited to, at least one of:

a) 3gpp-sbi-discovery
b) 3gpp-sbi-target-apiroot
c) 3gpp-sbi-binding/3gpp-sbi-routing-binding In an example embodiment, if multiple pre-defined criteria or header routing criteria may be considered, the processor (s) or controller(s) 404 may be able to prioritize the pre-defined criteria to enable appropriate selection of endpoints prior to routing of the request. Various other embodiments may be possible.

Figure 11:
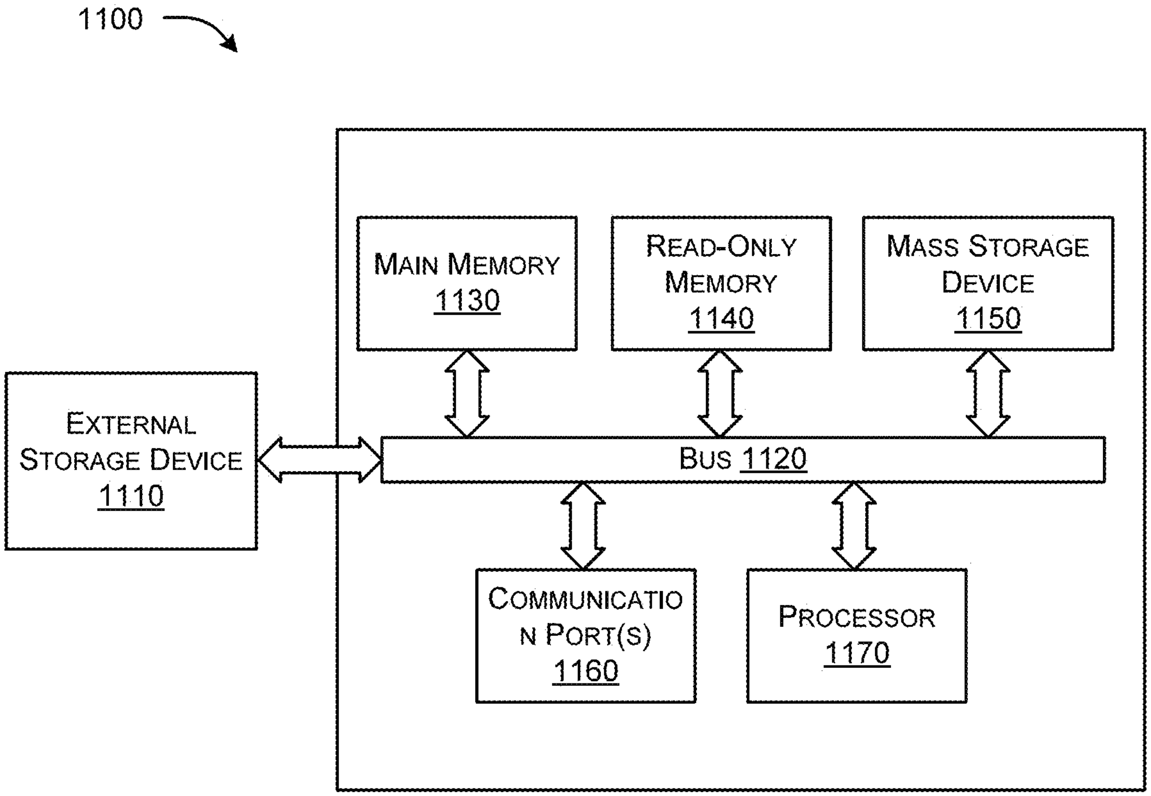
FIG. 11 illustrates an exemplary computer system in which or with which embodiments of the present invention may be utilized in accordance with embodiments of the present disclosure.

FIG. 11 illustrates an exemplary computer system in which or with which embodiments of the present invention may be utilized in accordance with embodiments of the present disclosure. As shown in FIG. 11, computer system 1100 may include an external storage device 1110, a bus 1120, a main memory 1130, a read only memory 1140, a mass storage device 1150, communication port 1160, and a processor 1170. A person skilled in the art will appreciate that the computer system may include more than one processor and communication ports. Processor 1170 may include various modules associated with embodiments of the present invention. Communication port 1160 may be any of an RS-232 port for use with a modem based dialup connection, a 10/100 Ethernet port, a Gigabit or 10 Gigabit port using copper or fibre, a serial port, a parallel port, or other existing or future ports. Communication port 1160 may be chosen depending on a network, such a Local Area Network (LAN), Wide Area Network (WAN), or any network to which computer system connects. Memory 1130 may be Random Access Memory (RAM), or any other dynamic storage device commonly known in the art. Read-only memory 1140 may be any static storage device(s). Mass storage 1150 may be any current or future mass storage solution, which may be used to store information and/or instructions.

Bus 1120 communicatively couples processor(s) 1170 with the other memory, storage and communication blocks. Optionally, operator and administrative interfaces, e.g. a display, keyboard, and a cursor control device, may also be coupled to bus 1120 to support direct operator interaction with a computer system. Other operator and administrative interfaces may be provided through network connections connected through communication port 1160. Components described above are meant only to exemplify various possibilities. In no way should the aforementioned exemplary computer system limit the scope of the present disclosure.

It would be appreciated that the embodiments herein are explained with respect to SCP, however, the proposed system and method may be implemented in any computing device or external devices without departing from the scope of the invention.

While considerable emphasis has been placed herein on the preferred embodiments, it will be appreciated that many embodiments may be made and that many changes may be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Present Disclosure

The present disclosure provides a system and method to facilitate an effective and improved management of traffic routing pertaining to incoming requests.

The present disclosure provides a system and method that may be agnostic to architecture, structure, functionality of each node, and implementation of Network Functions.

The present disclosure provides a system and method facilitates SCP implementation that enables load balancing, routing, traffic monitoring, congestion control, service discovery and other such functions in an effective manner.

The present disclosure provides a system and method that enables effective management of the incoming requests.

The present disclosure provides a system and method that saves unnecessary re-routing and may also facilitate effective routing steps.

We claim:

1. A system (100) for performing ingress/egress active-standby-spare routing in a network, the system (100) comprising:

a Service Communication Proxy (SCP) controller (112) in communication with a plurality of endpoints, wherein the plurality of endpoints are grouped in either a first public land mobile network (PLMN) cluster or a second PLMN cluster such that an n number endpoint of the first PLMN cluster forms a pair with corresponding n+2 number endpoint of the second PLMN cluster, wherein n is any natural number, and wherein the SCP controller (112) comprising one or more processors (404) coupled to a memory (410) storing instructions executable by the one or more processors, the SCP controller (112) configured to:

receive, from one or more source node devices in communication with the SCP controller (112), a plurality of requests to be transmitted to the first and the second PLMN clusters;

determine status of a plurality of paired n number endpoint and n+2 number endpoint associated with the first and the second PLMN clusters, respectively; and route the plurality of requests equally through the first PLMN cluster for transmitting to each said paired n number endpoint and the n+2 number endpoint associated with the first PLMN cluster and the second PLMN cluster, when the status of each said paired n number endpoint and the n+2 number endpoint is determined to be active, wherein the plurality of requests is routed equally to paired n number endpoint and the n+2 number endpoint associated with the first PLMN cluster and the second PLMN cluster respectively based on a round robin technique.

2. The system as claimed in claim 1, wherein the routing is used at any or a combination of egress and ingress proxy.

3. The system as claimed in claim 1, wherein the SCP controller 112 is configured to route the plurality of requests to only one endpoint in a pair at a time.

4. The system as claimed in claim 1, wherein prior to routing, the SCP controller 112 is configured to identify at least one available endpoint of the paired endpoints pertaining to the first PLMN cluster and the second PLMN cluster, wherein the first PLMN cluster comprises a plurality of active endpoints to which the plurality of requests is routed if the plurality of endpoints are available, wherein the second PLMN cluster comprises a plurality of corresponding alternative endpoints for routing the plurality of requests if the corresponding plurality of active endpoints are unavailable or non-functional.

5. The system as claimed in claim 4, wherein the routing, based on identification of the paired endpoints is performed based on pre-defined policy of the SCP controller 112.

6. The system as claimed in claim 1, wherein when all the plurality of end points are active, the SCP controller is configured to route 50% of the plurality of requests to a first pair comprising the n number endpoint of the first PLMN cluster and the n+2 number endpoint of the second PLMN cluster while the other 50% of the plurality of requests is routed to a second pair comprising a 2n number endpoint of the first PLMN cluster and a 2n+2 number endpoint of the second PLMN cluster.

7. The system as claimed in claim 1, wherein when the n number end point of the first pair is inactive and the remaining end points are active, the SCP controller (112) is configured to route 50% of the plurality of requests to the n+2 number endpoint of the second PLMN cluster while the other 50% of the plurality of requests is routed to the 2n number endpoint of the first PLMN cluster.

8. The system as claimed in claim 1, wherein when the 2n number end point of the second pair is inactive and the remaining end points are active, the SCP controller (112) is configured to route 50% of the plurality of requests to the n number endpoint of the first PLMN cluster while the other 50% of the plurality of requests is routed to the 2n+2 number endpoint of the second PLMN cluster.

9. The system as claimed in claim 1, wherein when either or both n+2 number endpoint and the 2n+2 number endpoint of the second PLMN cluster are inactive and the remaining end points are active, the SCP controller (112) is configured to route the plurality of requests equally to the n number endpoint of the first PLMN cluster and the 2n number endpoint of the first PLMN cluster.

10. The system as claimed in claim 1, wherein when either or both n number endpoint and the 2n number endpoint of the first PLMN cluster are inactive and the remaining end points are active, the SCP controller (112) is configured to route the plurality of requests equally to the n+2 number endpoint of the first PLMN cluster and the 2n+2 number endpoint of the second PLMN cluster.

11. The system as claimed in claim 1, wherein when both n number endpoint and the n+2 number endpoint of the first pair are inactive, the SCP controller (112) is configured to route 100% of the plurality of requests to the 2n number endpoint of the first PLMN cluster.

12. The system as claimed in claim 1, wherein when both 2n number endpoint and the 2n+2 number endpoint of the second pair is inactive, the SCP controller (112) is configured to route 100% of the plurality of requests to the n number endpoint of the first PLMN cluster.

13. The system as claimed in claim 1, wherein when only one endpoint is active while remaining endpoints are inactive, the SCP controller (112) is configured to route the plurality of requests routed to the only active endpoint.

14. The system as claimed in claim 13, wherein with O based indexing, endpoint at even index belongs to the first PLMN cluster while odd index belongs to the DR cluster.

15. The system as claimed in claim 1, wherein the number of endpoints in the first PLMN cluster is equal to the number of endpoints in the second PLMN cluster.

16. The system as claimed in claim 1, wherein the second PLMN cluster is a disaster recovery (DR) cluster for the first PLMN cluster, wherein the first PLMN cluster is the active cluster, and wherein the routing of the plurality of requests is directly sent to an endpoint in the DR cluster if the corresponding active endpoint in the first PLMN cluster is unavailable.

17. A user equipment (UE) (108) communicatively coupled with a SCP controller (112), said SCP controller coupling comprises steps of receiving a connection request from the UE 108;

sending an acknowledgment of connection request to the SCP controller;

transmitting a plurality of signals in response to the connection request, wherein said SCP controller is in communication with at least two public land mobile network (PLMN) clusters of the system as claimed in claim 1.

18. A method (190) for performing ingress/egress active-standby-spare routing in a network, the method comprising:

receiving, a Service Communication Proxy (SCP) controller (112), a plurality of requests to be transmitted to the first and the second PLMN clusters from one or mode source node devices in communication with the SCP controller (112), wherein the SCP controller (112) is in communication with a plurality of endpoints, wherein the plurality of endpoints are grouped in either a first PLMN cluster or a second PLMN cluster such that an n number endpoint of the first PLMN cluster forms a pair with an n+2 number endpoint of the second PLMN cluster, wherein n is any natural number, and wherein the SCP controller (112) further comprises one or more processors (404) coupled to a memory (410) storing instructions executable by the one or more processors (404);

determining, by the SCP controller (112), status of a plurality of paired n number endpoint and n+2 number end point associated with the first and the second PLMN clusters respectively; and routing, by the SCP controller (112), the plurality of requests equally through the first PLMN cluster for transmitting to each said paired n number endpoint and the n+2 number endpoint associated with the first PLMN cluster and the second PLMN cluster respectively, when the status of each said paired n number endpoint and the n+2 number endpoint is determined to be active, wherein the plurality of requests is routed equally to each paired n number endpoint and the n+2 number endpoint associated with the first PLMN cluster and the second PLMN cluster respectively based on a round robin technique.

19. The method as claimed in claim 18, wherein the routing is used at any or a combination of egress and ingress proxy.

20. The method as claimed in claim 18, wherein the method further comprises the step of routing, by the SCP controller (112), the plurality of requests to only one endpoint in a pair at a time.

21. The method as claimed in claim 18, wherein prior to routing, the method further comprises the step of identifying, by the SCP controller 112, at least one available endpoint of the paired endpoints pertaining to the first PLMN cluster and the second PLMN cluster, wherein the first PLMN cluster comprises a plurality of active endpoints to which the plurality of requests is routed if the plurality of endpoints are available, wherein the second PLMN cluster comprises a plurality of corresponding alternative endpoints for routing the plurality of requests if the corresponding plurality of active endpoints are un-available or non-functional.

22. The method as claimed in claim 21, wherein the routing, based on identification of the paired endpoints is performed based on pre-defined policy of the SCP controller 112.

23. The method as claimed in claim 18, wherein when all the plurality of end points are active, the method further comprises the step of routing, by the SCP controller (112), 50% of the plurality of requests to a first pair comprising the n number endpoint of the first PLMN cluster and the n+2 number endpoint of the second PLMN cluster while the other 50% of the plurality of requests is routed to a second pair comprising a 2n number endpoint of the first PLMN cluster and a 2n+2 number endpoint of the second PLMN cluster.

24. The method as claimed in claim 18, wherein when the n number end point of the first pair is inactive and the remaining end points are active, the method further comprises the step of routing, by the SCP controller (112), 50% of the plurality of requests to the n+2 number endpoint of the second PLMN cluster while the other 50% of the plurality of requests is routed to the 2n number endpoint of the first PLMN cluster.

25. The method as claimed in claim 18, wherein when the 2n number end point of the second pair is inactive and the remaining end points are active, the SCP controller is configured to route 50% of the plurality of requests to the n number endpoint of the first PLMN cluster while the other 50% of the plurality of requests is routed to the 2n+2 number endpoint of the second PLMN cluster.

26. The method as claimed in claim 18, wherein when either or both n+2 number endpoint and the 2n+2 number endpoint of the second PLMN cluster are inactive and the remaining end points are active, the method further comprises the step of routing, by the SCP controller (102), the plurality of requests equally to the n number endpoint of the first PLMN cluster and the 2n number endpoint of the first PLMN cluster.

27. The method as claimed in claim 18, wherein when either or both n number endpoint and the 2n number endpoint of the first PLMN cluster are inactive and the remaining end points are active, the SCP controller is configured to route the plurality of requests equally to the n+2 number endpoint of the first PLMN cluster and the 2n+2 number endpoint of the second PLMN cluster.

28. The method as claimed in claim 18, wherein when both n number endpoint and the n+2 number endpoint of the first pair are inactive, the method further comprises the step of routing, by the SCP controller (112), 100% of the plurality of requests to the 2n number endpoint of the first PLMN cluster.

29. The method as claimed in claim 18, wherein when both the 2n number endpoint and the 2n+2 number endpoint of the second pair is inactive, the method further comprises the step of routing, by the SCP controller (112), 100% of the plurality of requests to the n number endpoint of the first PLMN cluster.

30. The method as claimed in claim 18, wherein when only one endpoint is active while remaining endpoints are inactive, the method further comprises the step of routing, by the SCP controller (112), the plurality of requests routed to the only active endpoint.

31. The method as claimed in claim 18, wherein the number of endpoints in the first PLMN cluster is equal to the number of endpoints in the second PLMN cluster.

32. The method as claimed in claim 18, wherein the second PLMN cluster is a disaster recovery (DR) cluster for the first PLMN cluster, wherein the first PLMN cluster is the active cluster, and wherein the routing of the plurality of requests is directly sent to an endpoint in the DR cluster if the corresponding active endpoint in the first PLMN cluster is unavailable.

33. The method as claimed in claim 32, wherein with O based indexing, endpoint at even index belongs to the first PLMN cluster while odd index belongs to the DR cluster.

34. A non-transitory computer readable medium comprising processor-executable instructions causing a processor to:

receive, from one or more source node devices in communication with the processor, a plurality of requests to be transmitted to a first public land mobile network (PLMN) and a second PLMN cluster, wherein the processor is in communication with a plurality of endpoints, wherein the plurality of endpoints are grouped in either the first PLMN cluster or the second PLMN cluster such that an n number endpoint of the first PLMN cluster forms a pair with corresponding n+2 number endpoint of the second PLMN cluster, and wherein n is any natural number;

determine a status of a plurality of paired n number endpoint and n+2 number endpoint associated with the first and the second PLMN clusters, respectively; and route the plurality of requests equally through the first PLMN cluster for transmitting to each said paired n number endpoint and the n+2 number endpoint associated with the first PLMN cluster and the second PLMN cluster, when the status of each said paired n number endpoint and the n+2 number endpoint is determined to be active, wherein the plurality of requests is routed equally to the paired n number endpoint and the n+2 number endpoint associated with the first PLMN cluster and the second PLMN cluster, respectively, based on a round robin technique.

* * * * *